(12) United States Patent
Fujii et al.

(10) Patent No.: US 7,401,669 B2
(45) Date of Patent: Jul. 22, 2008

(54) BATTERY DEVICE OF VEHICLE POWER SUPPLY

(75) Inventors: Kazuhiro Fujii, Taka-gun (JP);
Tatsuhito Horiuchi, Kakogawa (JP);
Hideo Shimizu, Kakogawa (JP);
Wataru Okada, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 474 days.

(21) Appl. No.: 11/187,023

(22) Filed: Jul. 22, 2005

(65) Prior Publication Data
US 2006/0016633 A1    Jan. 26, 2006

(30) Foreign Application Priority Data
Jul. 22, 2004    (JP)    ............................. 2004-214929

(51) Int. Cl.
*B60R 16/04*    (2006.01)
(52) U.S. Cl. ..................................... 180/65.1; 180/68.5
(58) Field of Classification Search ................ 180/65.1, 180/68.5, 294; 280/727
See application file for complete search history.

(56) References Cited

U.S. PATENT DOCUMENTS

| | | | |
|---|---|---|---|
| 5,390,754 A * | 2/1995 | Masuyama et al. ......... | 180/68.5 |
| 5,501,289 A * | 3/1996 | Nishikawa et al. ......... | 180/68.5 |
| 5,555,950 A * | 9/1996 | Harada et al. .............. | 180/65.1 |
| 5,681,057 A * | 10/1997 | Whirley et al. .............. | 280/784 |
| 6,227,322 B1* | 5/2001 | Nishikawa .................. | 180/68.5 |
| 6,598,691 B2* | 7/2003 | Mita et al. .................. | 180/65.1 |
| 7,051,825 B2* | 5/2006 | Masui et al. ................ | 180/68.5 |
| 7,070,015 B2* | 7/2006 | Mathews et al. ........... | 180/68.5 |
| 7,137,466 B2* | 11/2006 | Kawasaki et al. .......... | 180/65.3 |

FOREIGN PATENT DOCUMENTS

JP    2003-45392    2/2003

* cited by examiner

*Primary Examiner*—Christopher Ellis
*Assistant Examiner*—Brian Swenson
(74) *Attorney, Agent, or Firm*—Wenderoth, Lind & Ponack, L.L.P.

(57) ABSTRACT

An electric power device for a vehicle has a case that is divided into a first case and a second case. The first case and second case are coupled so as to be separable from each other by the shock of a crash. In the power device, furthermore, a part of the first case and the second case, or a coupling member coupling the first case to the second case, is laminated, and a shock breakage pin to be broken by a predetermined shock penetrates through a laminated portion to couple the first case to the second case.

17 Claims, 25 Drawing Sheets

24 · · FRICTIONAL RESISTANCE REDUCING SHEET
25 · · SUSPENDING PORTION

35・・COUPLING PACKING    36・・BOUNDARY GROOVE

BATTERY DEVICE OF VEHICLE POWER SUPPLY

This application is based on Application No. 2004-214,929 filed in Japan on Jul. 22, 2004, the content of which is incorporated hereinto by reference.

BACKGROUND OF THE INVENTION

1. Field of the Invention

The present invention relates to a power device for driving a motor mounted on a hybrid car or an electric car and causing a vehicle to run.

2. Description of the Related Art

An automobile such as an electric car running by means of an electric motor or a hybrid car running by means of both an electric motor and an engine mounts a power device accommodating a battery in a case. The power device causes the automobile to run by means of an electric motor. In order to increase an output, therefore, a large number of batteries are connected in series, thereby raising an output voltage. For example, a voltage of an electrical battery to be mounted on an automobile is 12V with few exceptions, and the output voltage of the power device for driving a motor for running is generally 200V or more, which is very high.

In a typical hybrid car on the market, an electric motor output is several tens kW and an output voltage of a power device is set to be 200 to 300V. The power device is designed to be resistant to a high power. Therefore, if an automobile is broken due to a car crash so that a short circuit is caused in an inner part, a very large current flows, which may cause a car fire. In order to prevent this bad effect, a power device has been developed for controlling a state in which an automobile is broken due to a crash.

SUMMARY OF THE INVENTION

In a conventional power device, a case is divided into a front battery housing portion and a rear shock absorbing portion. When a collision is caused from behind, an automobile crashes while absorbing a shock with the shock absorbing portion pressed into a portion provided under the front battery housing portion. More specifically, the shock absorbing portion is pressed into the portion provided under the battery housing portion, and the battery housing portion is tilted from a horizontal orientation in a vertical direction to carry out a crash while maintaining a safety.

The power device is manufactured by dividing a case into a plurality of portions, and serves to absorb a shock caused by a crash. The battery housing portion and the shock absorbing portion are separately divided and mounted on a vehicle, and the battery housing portion is tilted so that the shock absorbing portion can be moved forward. However, a great deal of time and labor is required to mount the structure in which the battery housing portion and the shock absorbing portion are separated from each other on the vehicle. For example, with a structure in which a fan is built in the shock absorbing portion, it is necessary to couple an air duct of the fan in the shock absorbing portion to the battery housing portion. The structure for coupling the battery housing portion to the shock absorbing portion can easily be mounted on a vehicle. When the battery housing portion and the shock absorbing portion are coupled to one cover plate, an upper cover for example, they are reliably separated from each other during a shock caused by a crash; however, it is hard to guarantee a sufficient strength in a state of assembly into the vehicle and mounting on the vehicle. More specifically, the battery housing portion and the shock absorbing portion are reliably separated from each other through a coupling portion during a crash. In a state in which the vehicle does not crash, however, it is hard to prevent the coupling portion from causing the separation.

The present invention has been developed in order to solve the aforementioned drawbacks. An important object of the present invention is to provide a power device for a vehicle which can reliably separate first and second cases fabricated with a division when a shock is caused by a crash, thus enhancing safety, and can firmly couple them when mounting them.

A power device for a vehicle according to the present invention divides a case 1 into a first case 1A and a second case 1B and accommodates a battery for driving a motor to cause the vehicle to run in the case 1, and couples the divided first case 1A and second case 1B so as to be separated by a shock of a crash. Furthermore, the power device laminates a part of the first case 1A and the second case 1B, or a coupling member coupling the first case 1A and the second case 1B, and causes a shock breakage pin 9 to be broken by a predetermined shock to penetrate through a laminated portion, thereby coupling the first case 1A to the second case 1B.

The power device described above has a feature that the first case and the second case are reliably separated during the shock caused by a crash, thus enhancing safety, and the first case and the second case are coupled to each other with a sufficient strength in a state of assembly into or mounting on a vehicle. The reason is that the power device couples the laminated portion of the first case and the second case with the shock breakdown pin to be broken by a shock. The shock breakdown pin penetrates and couples the laminated portion of the first case and the second case. With the coupling structure, when the shock of the crash is applied, the shock breakdown pin is cut or a head portion is deformed so that the shock breakdown pin slips out of a through hole penetrating through the first case and the second case, thereby separating the first case and the second case from each other. The shock breakdown pin is not broken in a state in which the shock of a crash, or the like, is not applied, and thus firmly couples the first case and the second case to each other. Therefore, a case obtained by coupling the first case and the second case through the shock breakdown pin can be mounted on a vehicle simply, easily and efficiently. Moreover, the coupling structure has a feature that the first case and the second case can be prevented from being separated from each other due to the vibration of the vehicle, or the like, in a state in which they are mounted on the vehicle, and can be firmly coupled to each other until a crash occurs. Furthermore, a coupling structure using the shock breakdown pin also has a feature that it can be prevented from deteriorating with the passage of time unlike an adhesive, and can firmly couple the first case to the second case for a long period of time.

In a power device for a vehicle according to the present invention, the shock breakage pin 9 can be a rivet to be broken by a shock of a crash.

In a power device for a vehicle according to the present invention, when the shock of the crash is applied, the first case 1A and the second case 1B are coupled to each other in such a manner that the first case 1A is tilted and the second case 1B is then moved to a position under the first case 1A.

In a power device for a vehicle according to the present invention, a front edge of the first case 1A is provided with a hinge for carrying out tiltable coupling to the vehicle, and the first case 1A can be coupled to the vehicle through the hinge.

A power device for a vehicle according to the present invention further comprises a fixing plate 15 to be fixed to the vehicle, and the fixing plate 15 and a rear portion of the first case 1A can be coupled to each other through a stopper cord 16 for limiting a maximum tilt angle of the first case 1A. In the power device, the stopper cord 16 can limit the tilt angle when the first case 1A is tilted by a shock caused by a crash.

In a power device for a vehicle according to the present invention, case 1 includes a base plate 2 made of metal. A front base plate 2A which is the base plate 2 of the first case 1A and a rear base plate 2B which is the base plate 2 of the second case 1B are coupled to each other through the shock breakage pin 9.

In a power device for a vehicle according to the present invention, case 1 includes a base plate 2 made of metal. A front base plate 2A which is the base plate 2 of the first case 1A, a rear base plate 2B which is the base plate 2 of the second case 1B, and a fixing plate 15 to be fixed to the vehicle are coupled through the shock breakage pin 9. The fixing plate 15 can be provided in a lower part, the front base plate 2A of the first case 1A can be provided in an upper part, and the rear base plate 2B can be provided between the front base plate 2A and the fixing plate 15.

In a power device for a vehicle according to the present invention, the first case 1A can include a front base plate 2A as a bottom plate and a front cover plate 4A as an upper cover. The front cover plate 4A can be fixed to the front base plate 2A.

In a power device for a vehicle according to the present invention, the second case 1B can include a rear base plate 2B as a bottom plate and a rear cover plate 4B as an upper cover. The rear base plate 2B and the rear cover plate 4B can be coupled to each other through a wire 33.

In a power device for a vehicle according to the present invention, the first case 1A can include a front base plate 2A as a bottom plate, and an insulating box 3 formed of plastic which is provided on the front base plate 2A. The insulating box 3 can be provided with a holder case 5 for accommodating a battery therein.

In a power device for a vehicle according to the present invention, the case 1 can include a front cover plate 4A as an upper cover of the first case 1A and a rear cover plate 4B as an upper cover of the second case 1B. The front cover plate 4A and the rear cover plate 4B can be laminated and coupled through a coupling packing 35 at a boundary to form a waterproof structure. Furthermore, in the power device, a laminated cover plate 4 on a lower surface has a boundary groove 36 provided along a coupling edge. The boundary groove 36 can be provided with a coupling packing 35, and a coupling edge of the laminated cover plate 4 on the upper surface of the boundary groove 36 can be guided to couple the first case 1A to the second case 1B.

In a power device for a vehicle according to the present invention, a wire harness 29 coupling the first case 1A to the second case 1B can have such a length as to couple the first case 1A to the second case 1B in a orientation to allow the first case 1A to tilt at 15 degrees or more.

In a power device for a vehicle according to the present invention, a laminated portion obtained by laminating and coupling the first case 1A and the second case 1B can be set to be a tilted surface, and a frictional resistance reducing sheet 24 can be interposed between the first case 1A and the second case 1B in the laminated portion of the tilted surface.

In a power device for a vehicle according to the present invention, furthermore, a suspending portion 25 can be provided on the upper surface of the case 1.

The above and further objects and features of the invention will be more fully apparent from the following detailed description with accompanying drawings.

DETAILED DESCRIPTION OF THE PREFERRED EMBODIMENTS

Figure 1:
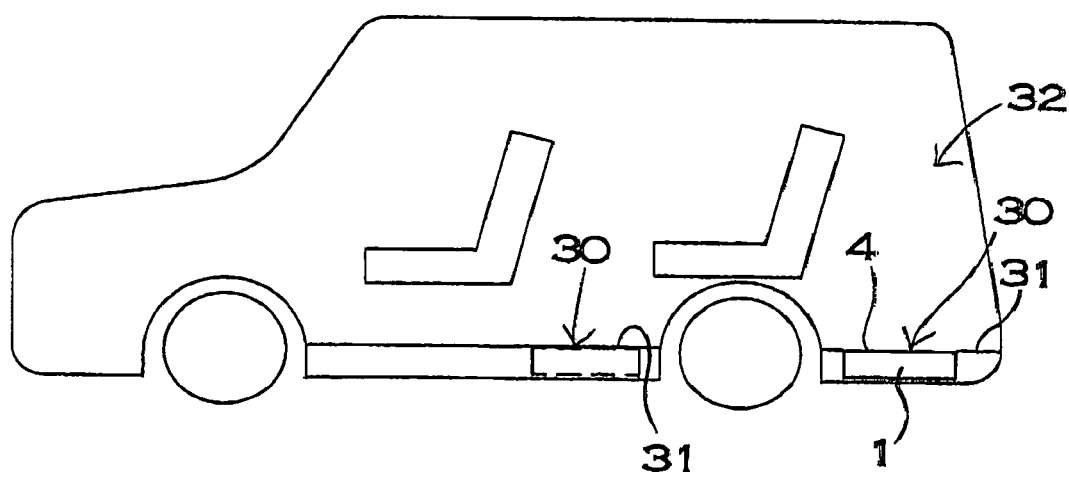
FIG. 1 is a schematic view showing a state in which a power device for a vehicle according to an embodiment of the present invention is mounted on the vehicle.

A vehicle shown in FIG. 1 mounts a power device on a floor 30. The power device to be mounted on the floor 30 of the vehicle is disposed on a loading space 32 provided behind a rear seat as shown in a solid line of FIG. 1 or the floor 30 between the rear seat and a front seat as shown in a chain line, for example. The power device is mounted in such a manner that the upper surface of a case 1 is on the level of a floor panel 31 of the vehicle, and a cover plate 4 fixed to the upper surface of the case 1 can be used as a part of the floor panel 31 of the vehicle. The case 1 sets the cover plate 4 to be a metal plate for bearing the load of the floor panel 31. The power device in which the cover plate 4 bears a load corresponding to a loading of the loading space 32 does not need to support the upper part of the cover plate 4 to withstand a load which is equal to that of the floor panel 31. A concave portion or an opening portion is provided on the floor panel 31 and the power device is mounted in the concave portion or the opening portion and an upper surface thereof can be set to be a withstand load which is equivalent to the floor panel 31.

Suppose the power device to be mounted on the floor 30 of the vehicle is struck from behind in a crash. At this time, the case 1 can be divided into a plurality of blocks, thereby enhancing safety. In addition to the power device to be mounted on the floor 30, all power devices to be mounted on the vehicle can be caused to divide into a plurality of blocks and can thus enhance safety.

Description will be given of a specific example of a power device to be mounted on the floor 30 of the vehicle, and to be divided longitudinally at the time of a crash. The power device for a vehicle according to the present invention does not need to be divided as will be described below. During a crash, the most proper division is change, depending on orientation or mounting position on the vehicle.

Figure 2:
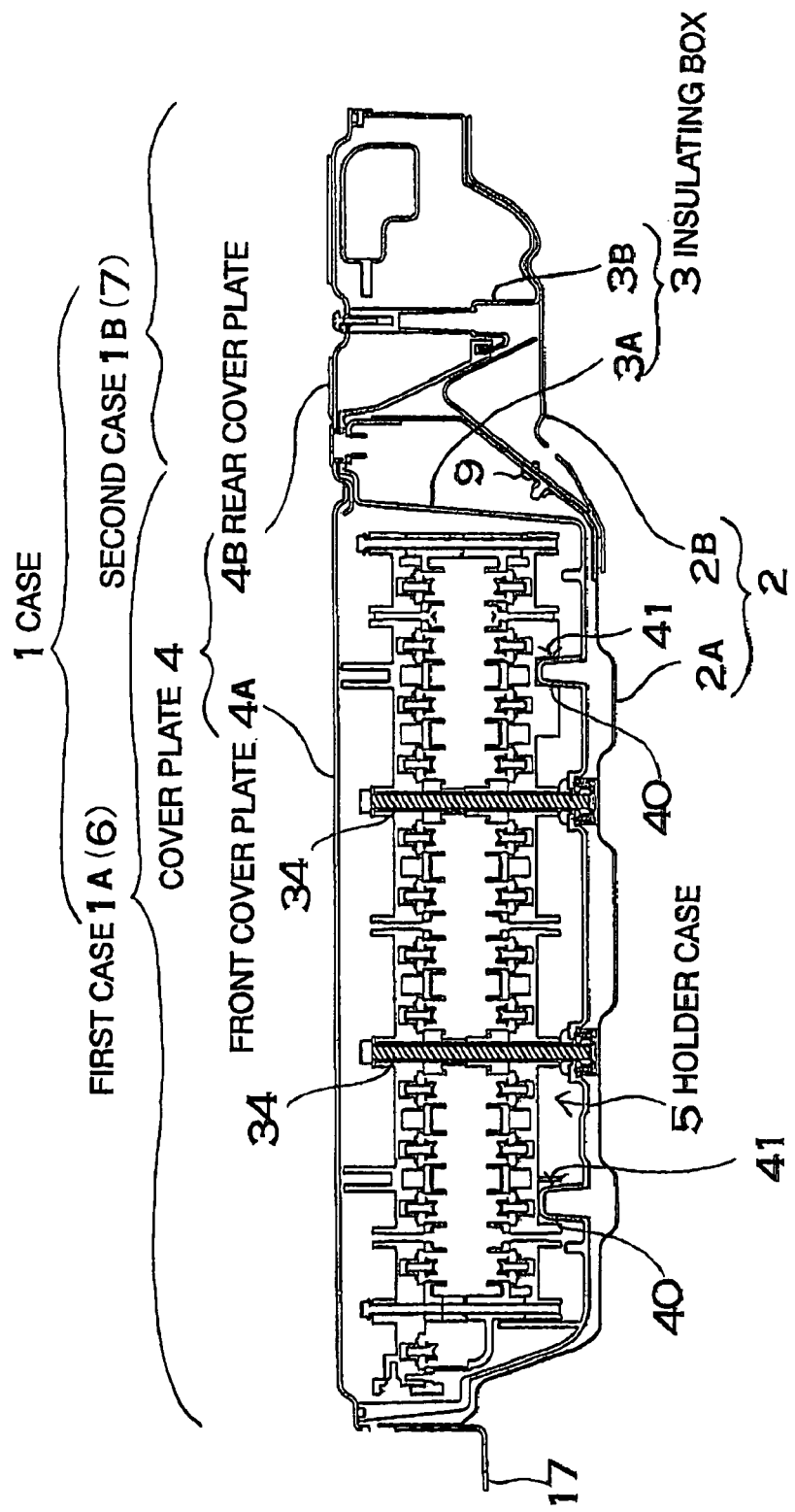
FIG. 2 is a sectional view showing the power device for a vehicle according to the embodiment of the present invention, which is taken away in a longitudinal direction of the vehicle.
Figure 3:
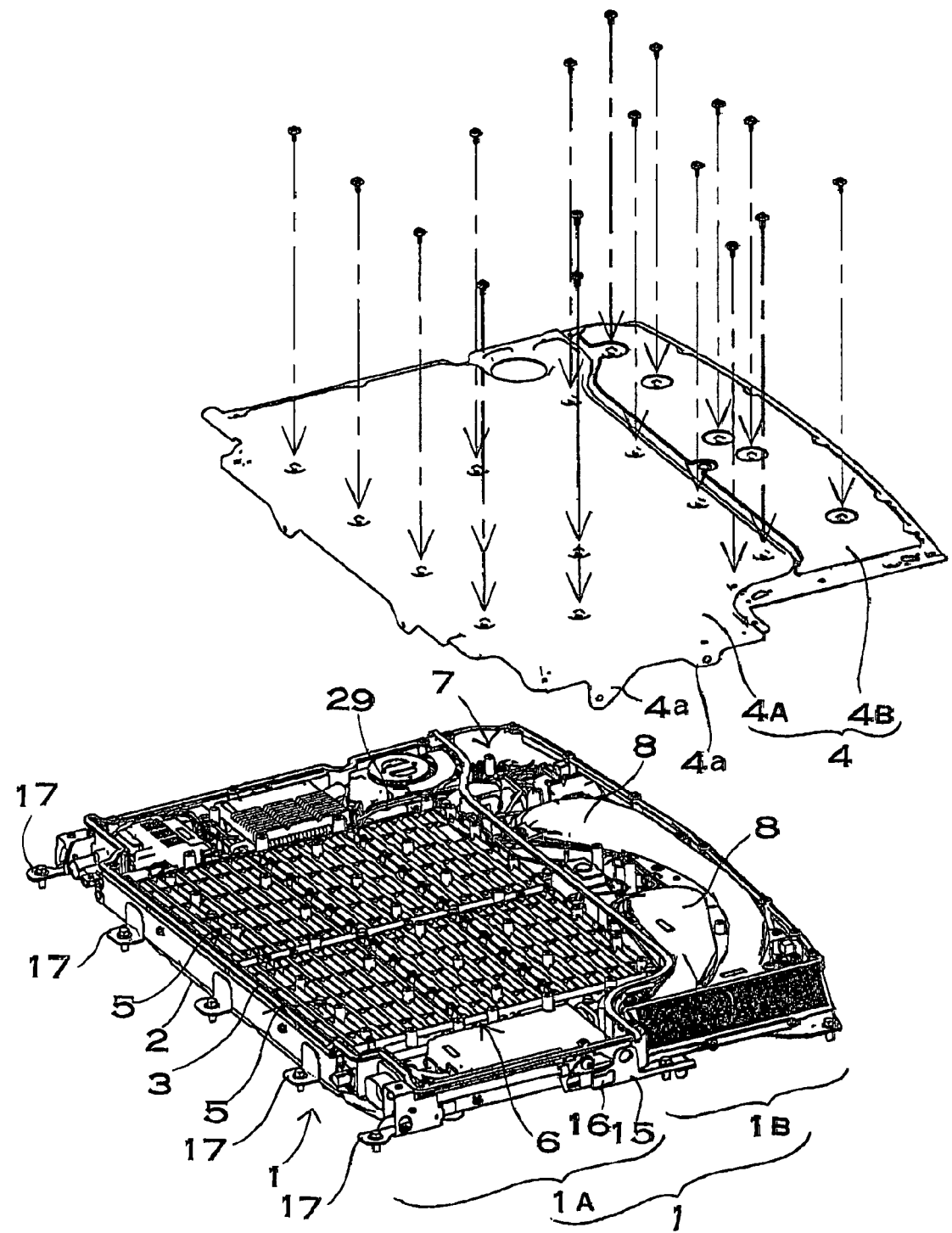
FIG. 3 is an exploded perspective view showing the power device illustrated in FIG. 2.
Figure 4:
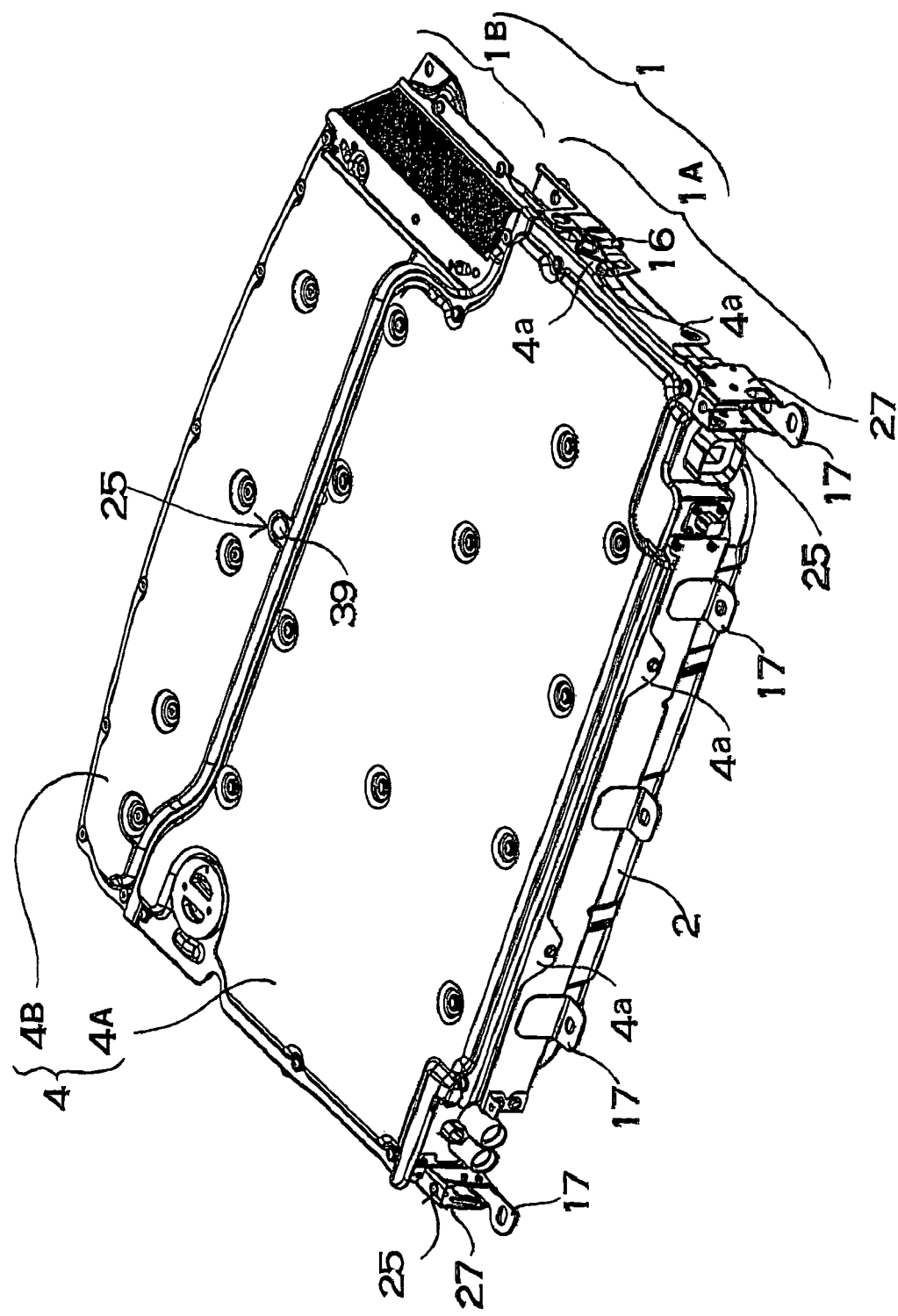
FIG. 4 is a perspective view showing the power device illustrated in FIG. 2.

FIG. 2 is a sectional view showing the power device taken away in the longitudinal direction of the vehicle. FIG. 3 is a perspective view showing the power device with the cover plate 4 to be an upper cover removed, and FIG. 4 is a perspective view showing a closed state with the cover plate 4. As shown in these drawings, the power device includes the case 1, a battery, a fan 8 for cooling the battery, and a control circuit (not shown) for controlling the charge/discharge of the battery. The case 1 is divided into a first case 1A and a second case 1B, and the first case 1A and the second case 1B are coupled to each other through a boundary portion.

Figure 5:
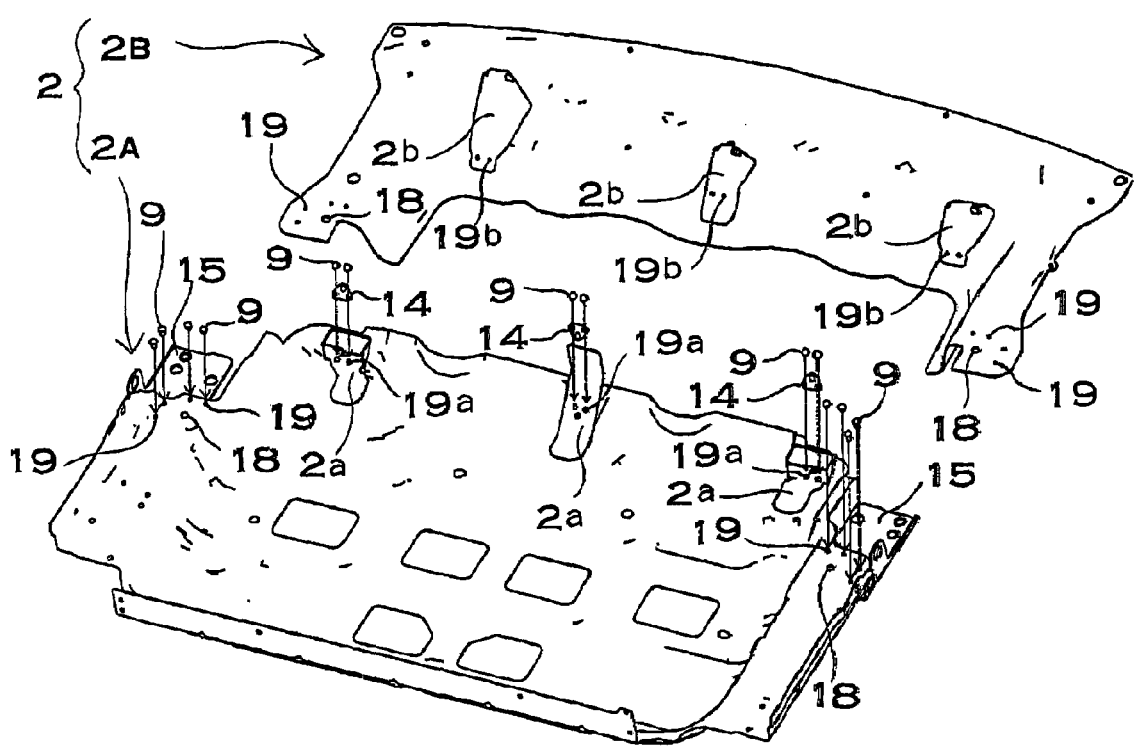
FIG. 5 is an exploded perspective view showing a base plate.
Figure 6:
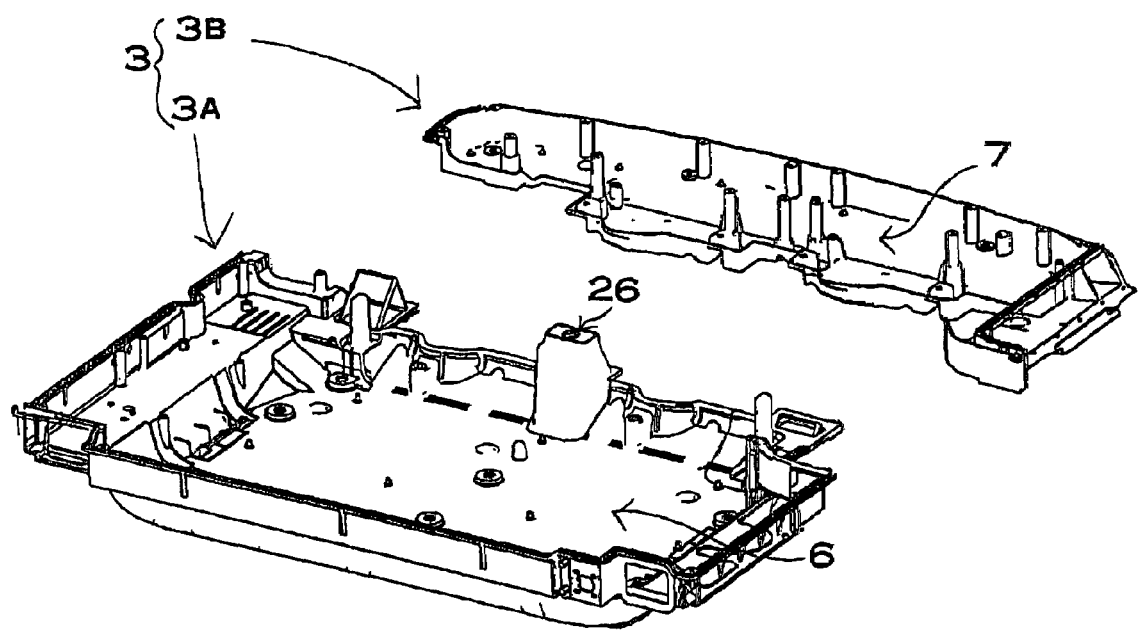
FIG. 6 is an exploded perspective view showing an insulating box.
Figure 7:
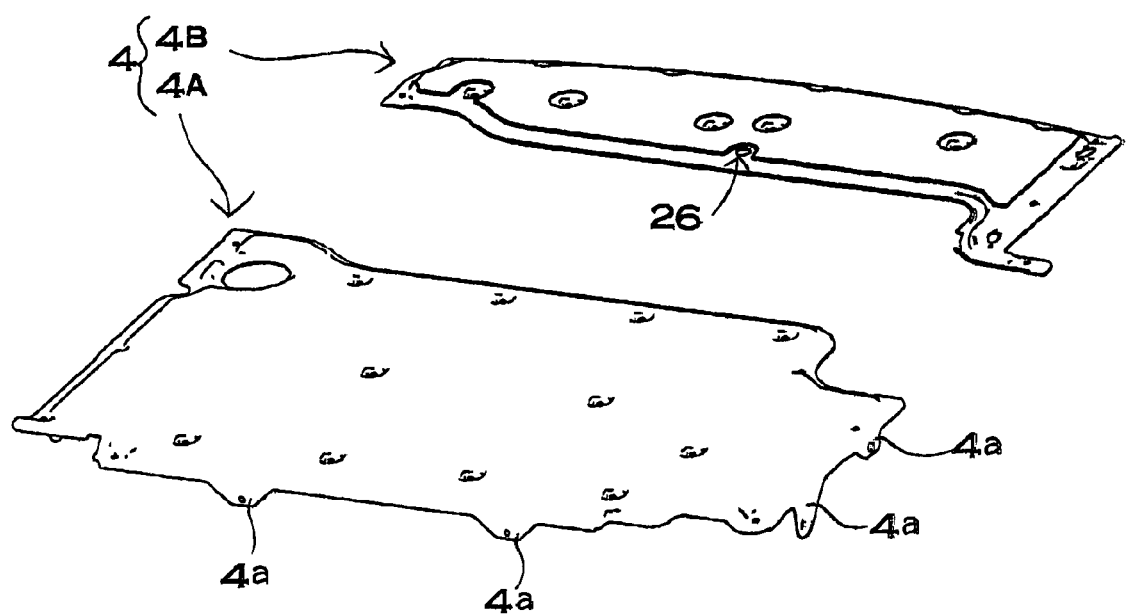
FIG. 7 is an exploded perspective view showing a cover plate.

The first case 1A and the second case 1B include a metallic base plate 2 shown in FIG. 5 which is fixed to a chassis and a floor panel in the vehicle, a plastic insulating box 3 shown in FIG. 6 which is fixed onto the base plate 2 and has an open upper part, and the metallic cover plate 4 shown in FIG. 7 which is fixed so as to close the upper opening portion of the insulating box 3.

In the power device shown in FIGS. 2 and 3, the case 1 is divided into the first case 1A and the second case 1B, and the first case 1A is a battery housing portion 6 and the second case 1B is a shock absorbing portion 7 provided behind the battery housing portion 6. A battery is accommodated in the battery housing portion 6 (the first case 1A). The fan 8 for cooling the battery is accommodated in the shock absorbing portion 7 (the second case 1B). In a power device according to the present invention, similarly, the first case could be set to be the shock absorbing portion and the second case could be set to be the battery housing portion.

Figure 8:
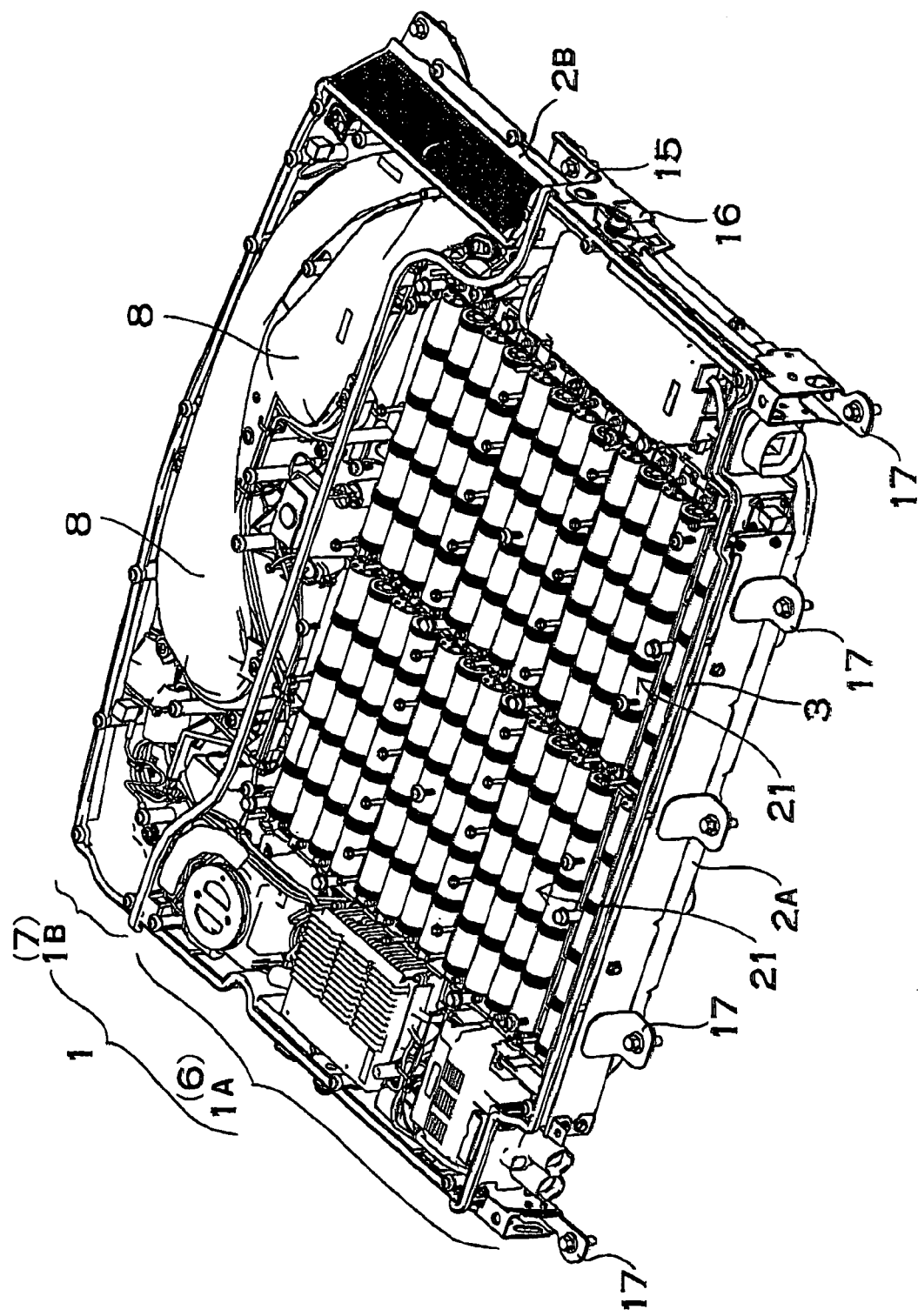
FIG. 8 is a perspective view showing a state in which a battery module is accommodated in a first case of the power device illustrated in FIG. 3.

The case 1 shown in FIGS. 2 and 3 is mounted on the vehicle in such a position that the first case 1A to be the battery housing portion 6 is positioned forward of the second case 1B (the shock absorbing portion 7). That is, the second case 1B is provided behind the first case 1A. Since the first case 1A positioned ahead is the battery housing portion 6, a plurality of battery modules 21 is accommodated through a holder case 5 as shown in FIG. 8. The battery modules 21 are accommodated in the holder case 5 and the holder case 5 is provided in the battery housing portion 6. The second case 1B provided behind the first case 1A accommodates the fan 8 for forcibly cooling the battery modules 21 in the holder case 5. The fan 8 is coupled to the holder case 5 and the cool air is forcibly supplied to the holder case 5 to cool the battery modules 21.

Furthermore, the case 1 of the power device longitudinally divides the base plate 2, the insulating box 3 and the cover plate 4 constituting the case 1 in a boundary portion between the first case 1A and the second case 1B and couples them in order to carry out a division into the first case 1A and the second case 1B. The reason why the case 1 is divided longitudinally is that the second case 1B is to be pressed into an area provided under the first case 1A to obtain a safe crush during a rear-end collision.

The case 1 includes the base plate 2, the insulating box 3 and the cover plate 4 which are divided. The first case 1A and the second case 1B are fabricated with a division and they are coupled to form one base plate 2. The case 1 shown in FIG. 2 has a structure such that a front base plate 2A as the base plate 2 of the first case 1A and a rear base plate 2B as the base plate 2 of the second case 1B are coupled to each other with a shock breakage pin 9 and the base plate 2 is divided at time of a crash. The shock breakage pin 9 is a rivet formed of aluminum. The rivet is broken by the shock of the crash so that the first case 1A and the second case 1B are reliably separated from each other. The shock breakage pin can also be fabricated by metals other than aluminum, for example, copper or the like, and furthermore, can be fabricated by hard plastic or the like. The rivet formed of plastic heats, presses and deforms an end. Moreover, it is also possible to use, as the shock breakage pin, a screw to be broken by the shock of the crash or the like.

The insulating boxes 3 are formed of plastic for the first case 1A and the second case 1B and are bonded and coupled at a boundary. The cover plates 4 which are fabricated for the first case 1A and the second case 1B overlap and are coupled to have a waterproof structure at a boundary. A front cover plate 4A for the first case 1A is bent partially downward on a front side and both sides to provide a bent portion 4a, and the bent portion 4a is screwed into the front base plate 2A so as to be coupled to each other. A rear cover plate 4B is coupled to a second box 3B or/and a rear base plate 2B.

The case 1 shown in FIG. 2 separates the front base plate 2A and the rear base plate 2B into the first case 1A and the second case 1B through the shock of a crash. The insulating box 3 has a smaller strength as compared with the base plate 2, and furthermore, the boundary is bonded and coupled. When the base plate 2 is separated due to the crash, therefore, the insulating box 3 is separated together with the base plate 2. Since the cover plate 4 does not directly fix the front cover plate 4A and the rear cover plate 4B, it is longitudinally separated together with the base plate 2 and the insulating box 3 due to the shock of a crash.

FIG. 5 shows the base plate 2 to be separated due to the shock of a crash. The base plate 2 is longitudinally separated and sets forward and rearward parts from the boundary portion to be a front base plate 2A for the first case 1A and a rear base plate 2B for the second case 1B. The front base plate 2A and the rear base plate 2B are coupled to each other at the boundary portion with the shock breakage pin 9 to be broken due to a shock when a vehicle crashes.

Furthermore, the front base plate 2A is provided with an upper surface tilted portion 2a having an upward gradient toward the rear part of the vehicle. The rear base plate 2B is provided with a lower surface tilted portion 2b along the lower surface of the upper surface tilted portion 2a of the front base plate 2A. In the front base plate 2A and the rear base plate 2B, the upper surface tilted portion 2a is laminated on the lower surface tilted portion 2b and they are coupled to each other with the shock breakage pin 9 as shown in the enlarged sectional view of FIG. 9. The upper surface tilted portion 2a of the front base plate 2A and the lower surface tilted portion 2b of the rear base plate 2B are required to have such a strength as to not be deformed by the shock of the crash. For this reason, they are fabricated of thick metal plates and are welded and fixed to the body portion of the base plate 2. The body portion of the base plate 2 is fabricated by pressing a thinner metal plate than the metal plates of the upper surface tilted portion 2a and the lower surface tilted portion 2b. In the lower surface tilted portion 2b, the metal plate is formed triangularly and is fixed to the body portion of the rear base plate 2B.

Figure 10:
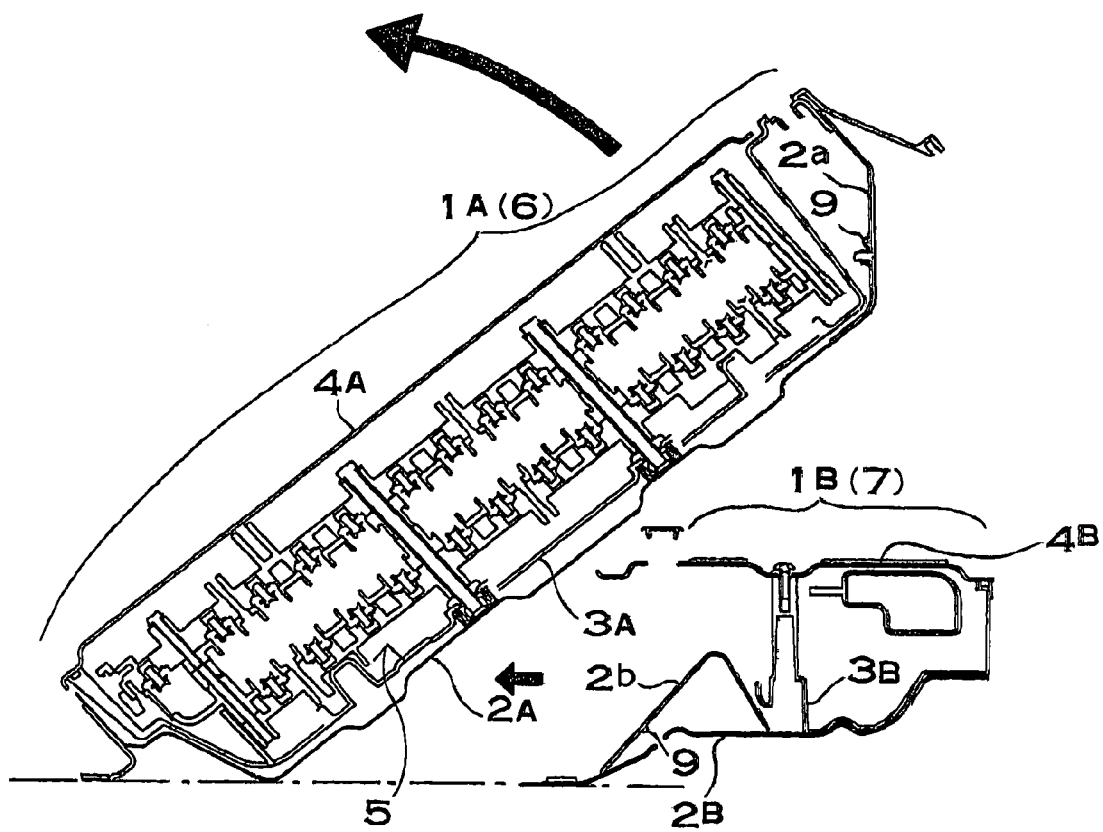
FIG. 10 is an enlarged sectional view showing a state in which the power device illustrated in FIG. 2 is divided into the first case and the second case.

The shock breakage pin 9 couples the upper surface tilted portion 2a and the lower surface tilted portion 2b through a positioning plate 14. In a base plate 2 having this structure, when the shock breakage pin 9 is broken by the shock of the crash, the lower tilted portion 2b slides along the lower surface of the upper surface tilted portion 2a, and at the same time, moves the rear base plate 2B forward. The rear base plate 2B moving forward pushes up the upper surface tilted portion 2a through the lower surface tilt portion 2b and pushes up the rear end of the front base plate 2A so as to be pressed thereunder as shown in FIG. 10. Therefore, the front base plate 2A with the rear end pushed up is tilted in a direction from a horizontal orientation to a vertical orientation. The rear base plate 2B is pressed into position provided under the front base plate 2A to be tilted in a vertical direction.

The coupling portion for coupling the front base plate 2A of the first case 1A to the rear base plate 2B of the second case 1B with the shock breakage pin 9 is shown in FIG. 5 and FIGS. 11 to 20. In the base plate shown in these drawings, two places in both side parts and three places in an intermediate part are coupled with a shock breakage pin 9.

The coupling portion is a positioning portion for coupling the first case 1A and the second case 1B without adjusting their relative positions. In the laminated portion of the positioning portion, the front base plate 2A of the first case 1A and the rear base plate 2B of the second case 1B are laminated without a positioning plate and are coupled to each other with the shock breakage pin 9. In the case 1 in the drawing, furthermore, a fixed plate 15 to be fixed to the vehicle is also laminated in the laminated portion of the positioning portion and is coupled with the shock breakage pin 9. In the laminated portion of the positioning portion, accordingly, the fixed plate 15, the rear base plate 2B and the front base plate 2A are provided sequentially from below as shown in FIGS. 12 to 15. The shock breakage pin 9 penetrates through the fixed plate 15, the rear base plate 2B and the front base plate 2A, thereby coupling them to be separated due to the shock of a crash. With this structure, the shock breakage pin 9 for coupling the first case 1A to the second case 1B is also used as the shock breakage pin 9 for coupling the case 1 to the fixed plate 15. Accordingly, it is not necessary to use a special shock breakage pin 9 in order to couple the fixed plate 15 to the case 1.

The fixed plate 15 is coupled to a chassis, a frame or the like, in the vehicle with such strength as to not be disconnected by the shock of a crash. Accordingly, the fixed plate 15 is fabricated from a thick metal plate so as not to be broken by the shock of a crash. The fixed plate 15 is coupled to the side portions of each of the first case 1A and the second case 1B through the shock breakage pin 9.

Figure 21:
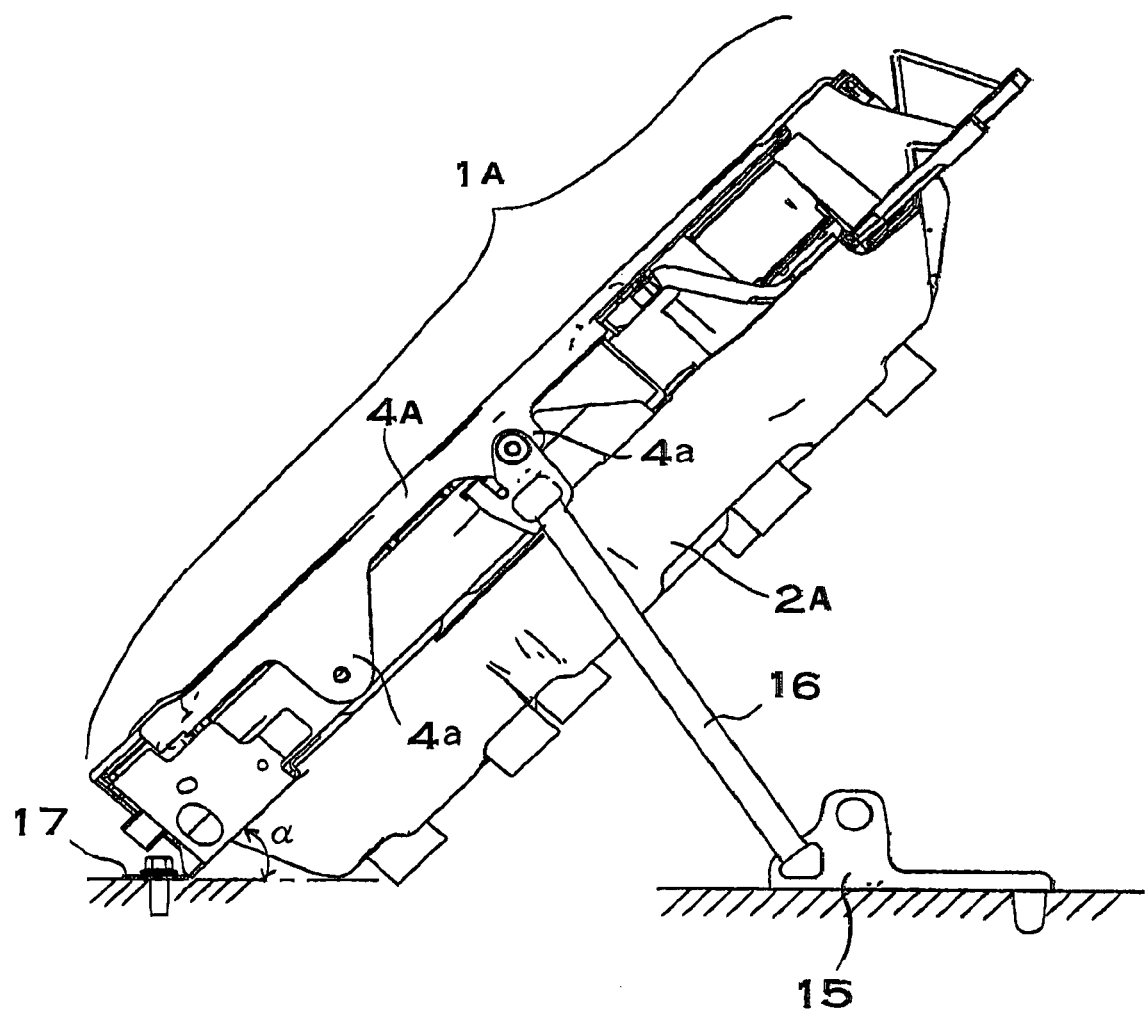
FIG. 21 is a side view showing a state in which the power device illustrated in FIG. 4 receives a shock so that the first case is tilted.

Furthermore, the fixed plate 15 is coupled to the rear part of the first case 1A through a stopper cord 16 as shown in FIG. 21. The stopper cord 16 is a cord member such as a band, a wire or a chain which is prevented from being broken by the shock of the crash and is flexible. The stopper cord 16 has one end coupled to the fixed plate 15 and the other end coupled to the coupling part of the front base plate 2A and the front cover plate 4A in the first case 1A. The stopper cord can also be coupled to either the front base plate or the front cover plate. The reason is that the front base plate and the front cover plate are tilted together. The stopper cord 16 limits a maximum tilt angle ($\alpha$) of the first case 1A tilted upon receipt of a shock as shown in FIG. 21. The maximum tilt angle ($\alpha$) of the first case 1A which is limited by the stopper cord 16 is preferably 60 to 90 degrees. The maximum tilt angle ($\alpha$) can also be set to be 45 to 120 degrees. When the first case 1A coupled to the fixed plate 15 through the stopper cord 16 is tilted by the shock of the crash, the first case 1A is stopped so as not to be tilted more greatly than the maximum tilt angle ($\alpha$).

In the case 1, the front edge of the first case 1A is fixed to the vehicle with a fixture 17 to be bent by the shock of the crash in addition to the fixed plate 15. In the case 1 shown in the drawing, the fixture 17 is fixed to the front edge of the front base plate 2A in the first case 1A. The front edge of the first case 1A can also be fixed to the vehicle through a hinge in place of the fixture. With this structure, the hinge is fixed to the front edge of the front base plate in the first case, and the case is fixed to the vehicle through the hinge. The first case fixed to the vehicle through the hinge can be tilted naturally when the shock breakage pin is broken by the shock of a crash.

The first case 1A and the second case 1B are provided with an assembly hole 18 in the positioning part. A positioning pin (not shown) is inserted in the assembly hole 18, the first case 1A and the second case 1B are positioned, and the shock breakage pin 9 is inserted into a through hole 19 of the front base plate 2A of the first case 1A and the rear base plate 2B of the second case 1B to carry out the coupling in this state. The base plate 2 shown in the drawing forms a positioning portion by pressing a metal plate. Therefore, the positioning portion can enhance processing precision and can thus decrease the errors of a dimension and a shape. A portion formed accurately is precisely coupled as the positioning portion through the shock breakage pin 9.

Three intermediate places are coupled using position adjusting portions as coupling parts in such a manner that the relative positions of the first case 1A and the second case 1B can be adjusted. The position adjusting portion couples the front base plate 2A of the first case 1A to the rear base plate 2B of the second case 1B with the shock breakage pin 9 through the positioning plate 14.

Figures 19, 20:
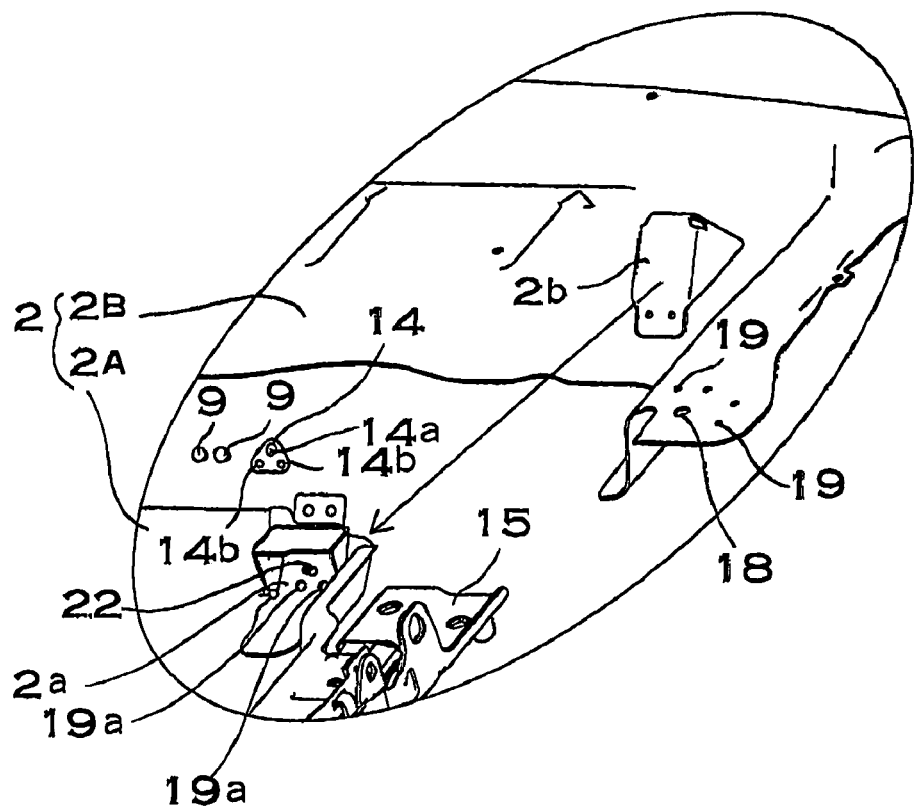
FIG. 19 is an exploded perspective view showing a coupling structure of a central right side portion of the base plate illustrated in FIG. 11.
FIG. 20 is an enlarged sectional view showing the coupling structure illustrated in FIG. 17.

Three intermediate position adjusting portions couple the first case 1A to the second case 1B through the positioning plate 14 and the shock breakage pin 9. The laminated portion of the position adjusting portion includes the upper surface tilted portion 2a of the front base plate 2A and the lower surface tilted portion 2b of the rear base plate 2B. FIG. 20 is a sectional view showing the position adjusting portion. For easy understanding, FIG. 20 is a sectional view which is cut away to pass through both the screw 22 and the shock breakage pin 9. As shown in FIG. 20, the front base plate 2A of the first case 1A has a greater breaking strength than the shock breakage pin 9, and couples the positioning plate 14 through the screw 22 which does not penetrate through the rear base plate 2B of the second case 1B and a nut 23 screwed onto the screw 22. A through hole 14a to allow the screw 22 to penetrate through the positioning plate 14 is a clearance hole and has a structure such that a coupling position can be adjusted with respect to the front base plate 2A of the first case 1A. Furthermore, the positioning plate 14 is laminated on the rear base plate 2B of the second case 1B to cause the shock breakage pin 9 to penetrate through the laminated portion, thereby coupling the front base plate 2A of the first case 1A to the rear base plate 2B of the second case 1B.

In FIG. 20, the screw 22 is welded and fixed to the front base plate 2A of the first case 1A so as to be protruded from an upper surface. The screw 22 penetrates through the positioning plate 14 and does not penetrate through the front base plate 2A of the first case 1A or the rear base plate 2B of the second case 1B. The reason is that the nut 23 screwed onto the screw 23 is not interposed between the front base plate 2A of the first cast 1A and the rear base plate 2B of the second case 1B. With the coupling structure in FIG. 20, the front base plate 2A of the first case 1A is interposed between the positioning plate 14 and the rear base plate 2B of the second case 1B. The front base plate 2A sets, as a clearance hole, a through hole 19a for inserting the shock breakage pin 9 therethrough. The reason is that the relative position of the front base plate 2A of the first case 1A with respect to the rear base plate 2B of the second case 1B is to be adjusted. More specifically, as shown in FIG. 20, the through hole 14a for inserting the screw 22 which is provided on the positioning plate 14 and the through hole 19a for inserting the shock breakage pin 9 into the front base plate 2A of the first case 1A are set as clearance holes. However, the through hole 14b for inserting the shock breakage pin 9 into the positioning plate 14 and the through hole 19b provided to insert the shock breakage pin 9 into the rear base plate 2B of the second case 1B are not clearance holes but positioning holes having inside diameters which are almost equal to the outside diameter of the shaft portion of the shock breakage pin 9, that is, having inside diameters without play or with a very small play together with respect to the shock breakage pin 9. In the clearance hole, the inside diameter has a larger play as compared to a positioning hole having the outside diameter of the screw 22 to be inserted therethrough or the shaft of the shock breakage pin 9. Accordingly, the clearance hole and the positioning hole have different gaps from each other which are formed together with a shaft to be inserted therethrough, and the gap of the clearance hole is set to be greater than that of the positioning hole so that the coupling positions can be adjusted relatively.

In the case 1 shown in the drawing, a tilted surface for coupling the front base plate 2A of the first case 1A to the rear base plate 2B of the second case 1B is set to be a position adjusting portion. In order to have such a tough structure as not to be deformed by a strong shock, the tilted surface is fabricated by another strong metal plate from the body portion of the base plate 2 fabricated by press molding and is welded and fixed to the body portion of the base plate 2. A base plate 2 having this structure results in great error in the position or shape of the tilt surface. By carrying out the coupling through the positioning plate 14 with the tilted surface as the position adjusting portion, it is possible to couple the front base plate 2A of the first case 1A to the rear base plate 2B of the second case 1B firmly and reliably.

Furthermore, the base plate 2 in FIG. 20 interposes a frictional resistance reducing sheet 24 between the front base plate 2A of the first case 1A and the rear base plate 2B of the second case 1B. The frictional resistance reducing sheet 24 is a sheet having a small frictional resistance, for example, a Teflon (registered trademark) sheet or the like. The base plate 2 will smoothly slide and move the rear base plate 2B of the second case 1B to a position under the front base plate 2A of the first case 1A in a state in which the shock breakage pin 9 is broken due to a shock caused by a crash.

The insulating box 3 shown in FIG. 2 is divided into a first box 3A and a second box 3B which are formed of plastic. The first box 3A and the second box 3B are coupled to each other at a boundary to constitute one insulating box 3.

FIG. 6 is a perspective view showing a state in which the insulating box 3 is longitudinally divided. The insulating box 3 is divided into the first box 3A provided ahead of the boundary portion and serving as the first case 1A and the second box 3B provided behind the boundary portion and serving as the second case 1B, and is fabricated by molding the plastic. The insulating box 3 formed by a division into the first box 3A and the second box 3B is separated longitudinally by the shock of a crash. The second box 3B thus separated is moved forward together with the rear base plate 2B, and the first box 3A is tilted together with the front base plate 2A.

Figure 9:
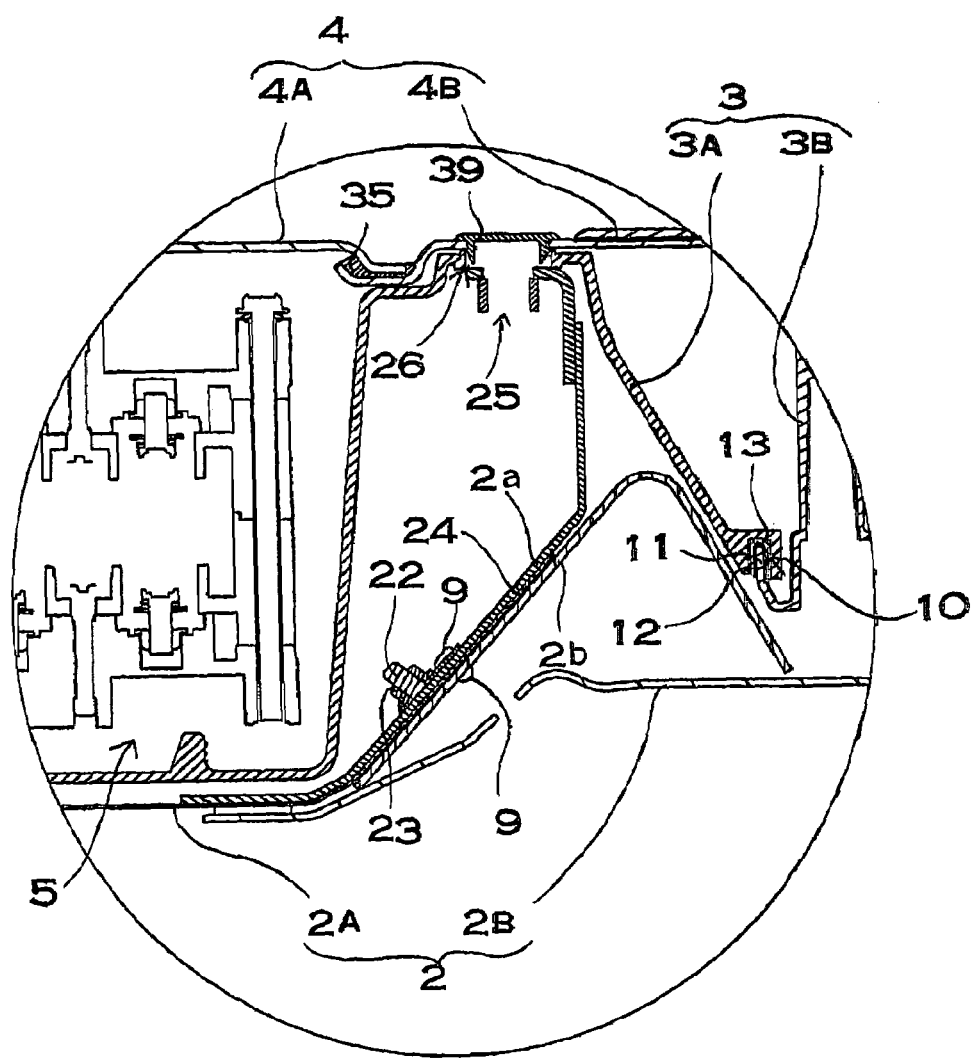
FIG. 9 is a sectional view showing a coupling portion of the first case and a second case.
Figure 22:
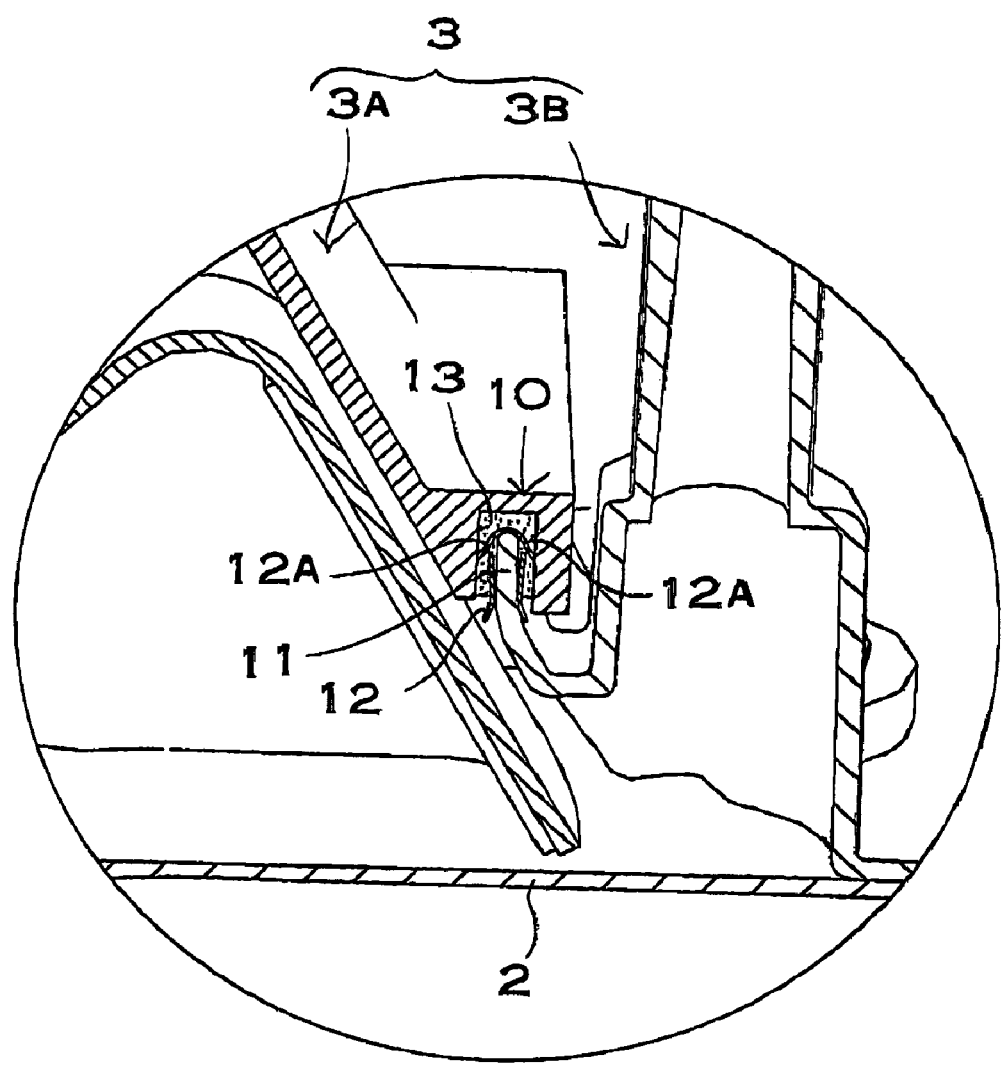
FIG. 22 is an enlarged sectional view showing a coupling portion of a first box and a second box illustrated in FIG. 9.
Figure 23:
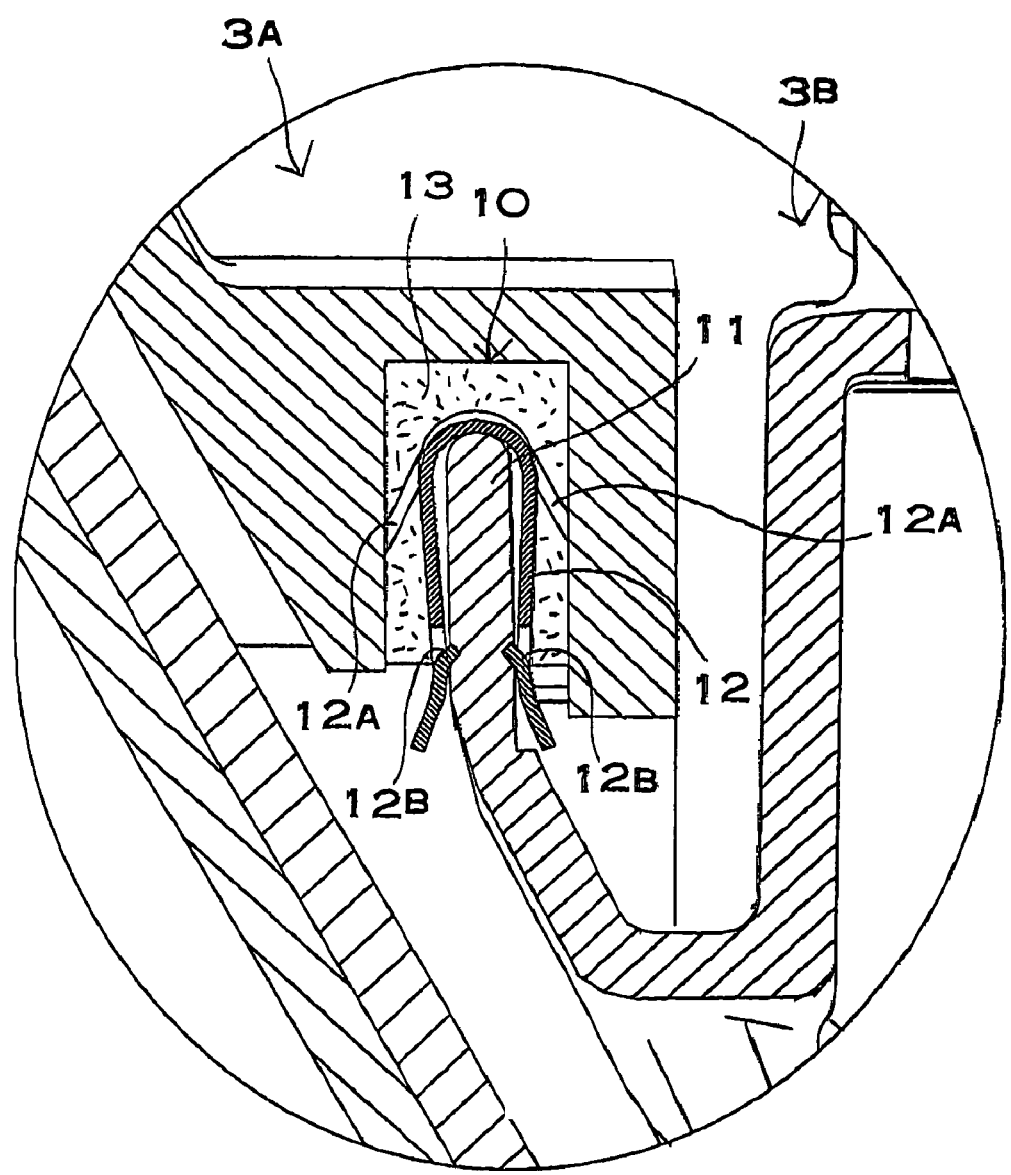
FIG. 23 is an enlarged sectional view showing a coupling structure of a coupling tool.

The first box 3A and the second box 3B are coupled to each other at a boundary and are fixed onto the base plate 2 as one insulating box 3. The coupling portion of the first box 3A and the second box 3B is shown in FIGS. 9, 22 and 23. In the insulating box 3 shown in these drawings, a coupling groove 10 is provided along the coupling portion of the first box 3A and the second box 3B. The second box 3B is provided with a coupling convex portion 11 to be inserted into the coupling groove 10 along the coupling portion to the first box 3A. The coupling groove 10 is opened downward and the coupling convex portion 11 is provided to be protruded upward. With this structure, water does not enter the coupling groove 10.

The coupling convex portion 11 is inserted into the coupling groove 10 and the first box 3A and the second box 3B are coupled at a boundary to constitute the insulating box 3. The coupling groove 10 and the coupling convex portion 11 are coupled with an adhesive 13 filled in a clearance between the internal surface of the coupling groove 10 and the surface of the coupling convex portion 11 and a coupling tool 12. The first box 3A and the second box 3B are provided with the coupling groove 10 and the coupling convex portion 11 continuously at the boundary. A portion between the coupling groove 10 and the coupling convex portion 11 is filled with the adhesive 13, and the first box 3A and the second box 3B are coupled and fixed continuously with a watertight structure at the boundary.

Figure 24:
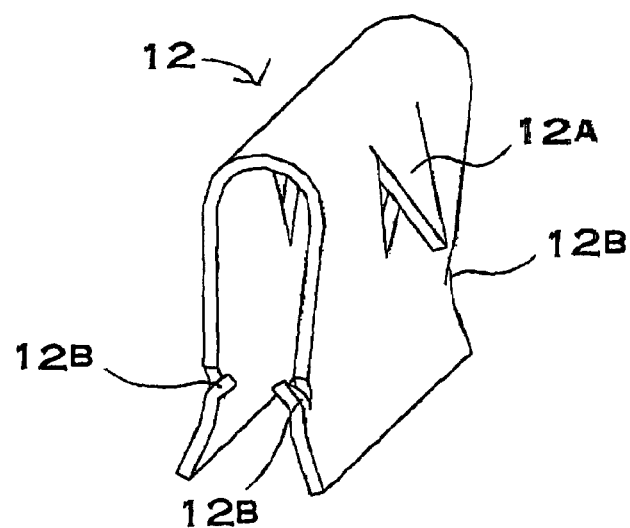
FIG. 24 is an enlarged perspective view showing the coupling tool.

The coupling groove 10 and the coupling convex portion 11 are provided with a clearance in which the coupling tool 12 can be put. The coupling tool 12 is formed to take the shape of a groove which can be put in the clearance between the coupling groove 10 and the coupling convex portion 11. The coupling tool 12 taking this shape is fabricated by pressing a metal plate such as iron which is deformed elastically. FIG. 24 is a perspective view showing the coupling tool 12 and FIG. 23 is an enlarged sectional view showing an engagement state. The coupling tool 12 is provided with an outer engagement projection 12A. The outer engagement projection 12A is inserted in the coupling groove 10 and is fixed to the first box 3A, and protrudes elastically outward. The outer engagement projection 12A protrudes from both sides in the vicinity of a U-shaped portion. The outer engagement projection 12A is not engaged in while inserting into the coupling groove 10, but cuts into the internal surface of the coupling groove 10 and is engaged therewith so as not to pull-out from the coupling groove 10. Accordingly, the outer engagement projection 12A has a tip taking a sharp shape. Moreover, the outer engagement projection 12A is tilted to gradually protrude in the pull-out direction which is opposite the direction of insertion into the coupling groove 10 and downward in FIGS. 23 and 24 in such a manner that the internal surface of the coupling groove 10 can be slid and moved only in the direction of insertion.

Furthermore, the coupling tool 12 is provided with an inner engagement projection 12B. The inner engagement projection 12B inserts into the coupling convex portion 11 to fix the second box 3B, and protrudes elastically inward. The inner engagement projection 12B protrudes inward in the vicinity of the opening portion of the groove portion. The inner engagement projection 12B is not engaged in a state in which the coupling convex portion 11 is inserted, but cuts into the surface of the coupling convex portion 11 and is engaged therewith when the coupling convex portion 11 is pulled outward. Accordingly, the inner engagement projection 12B has a tip taking a sharp shape, and is tilted to gradually protrude inward in a direction of the insertion of the coupling convex portion 11 and upward in FIGS. 23 and 24 in such a manner that the surface of the coupling convex portion 11 can be slid and moved only in the direction of the insertion.

The first box 3A and the second box 3B are coupled to each other in the following manner, thereby constituting the insulating box 3.

(1) The coupling groove 10 is filled with the adhesive 13. The coupling groove 10 is filled with the adhesive 13 in an uncured paste.

(2) In a state in which the adhesive 13 is uncured, the coupling tool 12 is inserted into the coupling groove 10. The coupling tool 12 slides the outer engagement projection 12A over the internal surface of the coupling groove 10 and is thus inserted into the coupling groove 10. The long coupling groove 10 provided along a boundary inserts a plurality of coupling tools 12 at a predetermined interval. For example, the coupling tool 12 is inserted in both end portions and an intermediate portion in the long coupling groove 10. In the coupling tool 12 inserted in the coupling groove 10, the outer engagement projection 12A is elastically pressed against the internal surface of the coupling groove 10 and is fixed to the coupling groove 10 so as not to fall out.

(3) The coupling convex portion 11 is put in the coupling groove 10. At this time, the coupling convex portion 11 is also inserted into the groove-shaped coupling tool 12. The coupling convex portion 11 is inserted into the coupling tool 12 with a surface sliding along the inner engagement projection 12B. The coupling convex portion 11 inserted in the inner part is engaged with the inner engagement projection 12B of the coupling tool 12 and is thus fixed so as not to fall out.

When a force for pulling out the coupling convex portion 11 from the coupling groove 10 acts in the above condition, the outer engagement projection 12A cuts into the internal surface of the coupling groove 10 and is thus engaged therewith and the inner engagement projection 12B cuts into the surface of the coupling convex portion 11 and is thus engaged therewith. Also in the state in which the adhesive 13 is uncured, therefore, the coupling convex portion 11 is coupled to the coupling groove 10 so as not to fall out.

(4) The adhesive 13 is cured and the coupling convex portion 11 is coupled to the coupling groove 10 with the adhesive 13 and the coupling tool 12 so that the first box 3A and the second box 3B constitute the insulating box 3.

Figure 25:
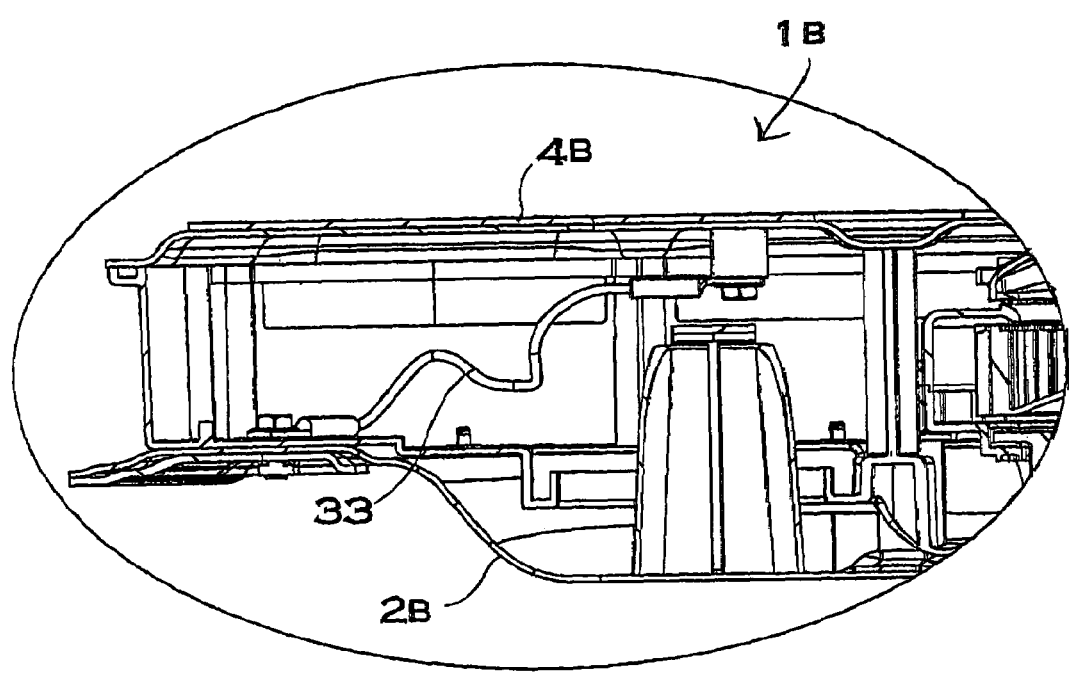
FIG. 25 is a sectional view showing an internal structure of the second case.

FIG. 7 is a perspective view showing a state in which the cover plate 4 is divided longitudinally. The cover plate 4 is divided into a front cover plate 4A provided ahead of a boundary portion and serving to cover the upper surface of the first case 1A, and a rear cover plate 4B provided behind the boundary portion and serving to cover the upper surface of the second case 1B. The front cover plate 4A and the rear cover plate 4B are fabricated from metal plate having a high strength. The cover plate 4 is preferably fabricated from an aluminum alloy. The cover plate 4 formed from an aluminum alloy can be light and tough. In particular, an aluminum alloy which can be quenched is suitable. Referring to the cover plate 4, an aluminum plate is molded by pressing and is then quenched to further enhance a strength. The rear cover plate 4B is coupled to the rear base plate 2B through a wire 33 as shown in FIG. 25 in such a manner that it is moved together with the rear base plate 2B when moving forward by the shock of a crash.

The front cover plate 4A is a metal plate and the rear cover plate 4B is a laminated metal plate in which a plurality of metal plates are laminated and fixed. The rear cover plate 4B, the laminated metal plate, has a greater bending strength than the front cover plate 4A. The rear cover plate 4B having a great bending strength requires less support from a lower surface to withstand a load. Therefore, it is possible to reduce a support portion to be provided in the shock absorbing portion 7 to be covered with the rear cover plate 4B.

The rear cover plate 4B is a laminated metal plate formed by laminating and fixing two aluminum alloy plates. The rear cover plate 4B can also be fabricated by laminating and fixing three or more metal plates. The rear cover plate 4B formed by the laminated metal plates bonds the laminated metal plates wholly or partially, and furthermore, is fabricated by local spot welding. The laminated metal plate to be partially bonded with an adhesive is set to have a bonding area to be 50% of a total laminated area or more in order to obtain a sufficient strength. In a laminated metal plate in which an epoxy type adhesive, or the like, which can strongly bond one metal plate to another metal plate wholly or partially is applied and superposed, and the adhesive is uncured, the metal plates are interposed between welding electrodes from both sides to come in contact with each other, and are spot welded and fixed in this condition. With this structure, the adhesive can be cured in the state in which the metal plates are fixed by the spot welding. Therefore, it is not necessary to wait for the adhesive to be cured, and it is possible to efficiently fix the metal plates which are laminated. The rear cover plate 4B formed of the laminated metal plate having this structure can be constructed to be very strong. In particular, a laminated metal plate fabricated by superposing two aluminum alloys can have a decreased weight and an increased maximum load. Since the laminated metal plate having this structure is laminated by separately molding the individual metal plates without molding a thick metal plate by pressing, it can be subjected to press molding and thus fixed simply, easily and efficiently to take an ideal shape. Furthermore, a laminated metal plate having this structure has a three-layer structure in which an adhesive is sandwiched between the metal plates. When using an adhesive to be cured in a curing state, for example an epoxy-type adhesive, it is possible to obtain a structure in which a bonding layer having a great strength is sandwiched between metal plates on both sides. The bonding layer has a smaller specific gravity and weight compared to the metal plate. In the sandwich structure, therefore, a light and hard layer is interposed between metal plates. In the laminated metal plate having this structure, it is possible to increase a whole thickness and a bending strength, and at the same time to reduce a weight. The reason is that both sides influence the bending strength and are strong metal plates, and the intermediate layer increases the thickness as a light bonding layer.

The laminated metal plate of the rear cover plate can also be fabricated by bonding the laminated metal plates, spot welding them, screwing and fixing them or coupling them in combination.

Figure 26:
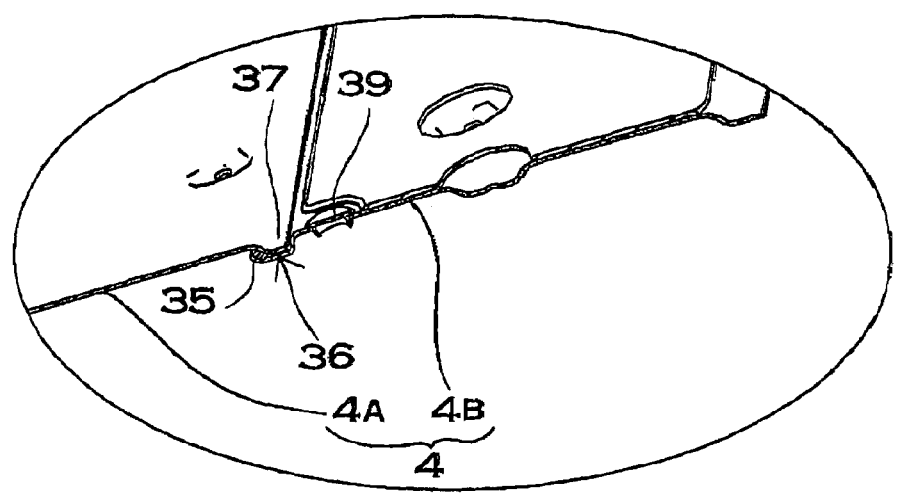
FIG. 26 is a sectional perspective view showing a coupling structure of a front cover plate and a rear cover plate.
Figure 27:
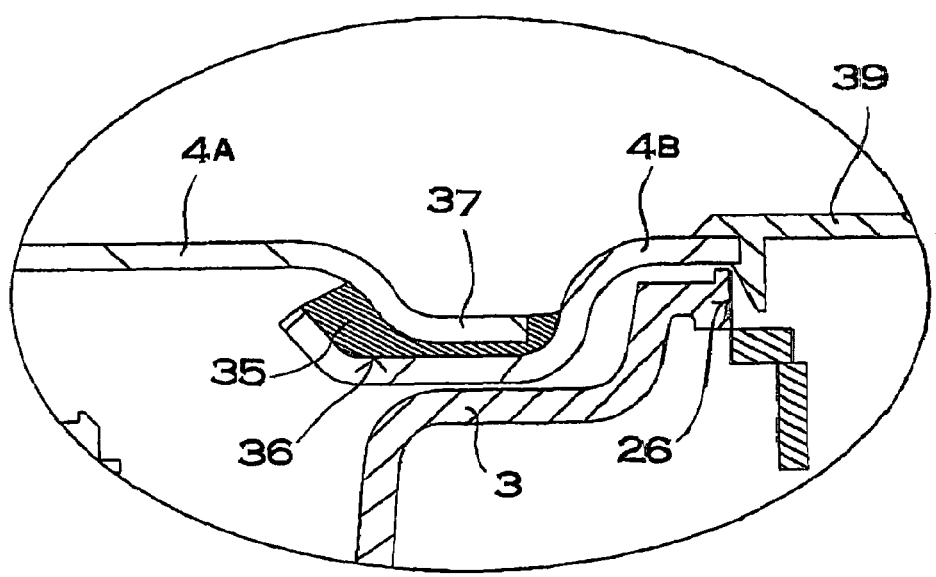
FIG. 27 is an enlarged sectional view showing a main part of the cover plate illustrated in FIG. 26.

In a cover plate shown in FIGS. 26 and 27, the rear cover plate 4B and the front cover plate 4A are laminated at a boundary and a coupling packing 35 is interposed in a laminated portion to couple them in a waterproof structure. In the laminated portion, the rear cover plate 4B is provided under the front cover plate 4A. The rear cover plate 4B to be a lower surface is provided with a boundary groove 36 along the laminated portion on the boundary. The boundary groove 36 is provided with the coupling packing 35, and the rear edge of the front cover plate 4A is superposed on the coupling packing 35 without a clearance. The front cover plate 4A is provided with a convex portion 37 to be put in the boundary groove 36 which is protruded from a lower surface along a boundary. The convex portion 37 of the front cover plate 4A presses the coupling packing 35, and the coupling packing 35 is interposed between the convex portion 37 and the boundary groove 36 so that the front cover plate 4A and the rear cover plate 4B are coupled to each other in the waterproof structure. The case 1 having the rear cover plate 4B laminated under the front cover plate 4A can separate the first case 1A and the second case 1B by the shock of a crash and can smoothly move the second case 1B to a position under the first case 1A which is tilted. The front cover plate can also be laminated under the rear cover plate. The case deforms the laminated portion of the cover plate when moving the second case to the position under the first case due to the shock of a crash.

Figure 28:
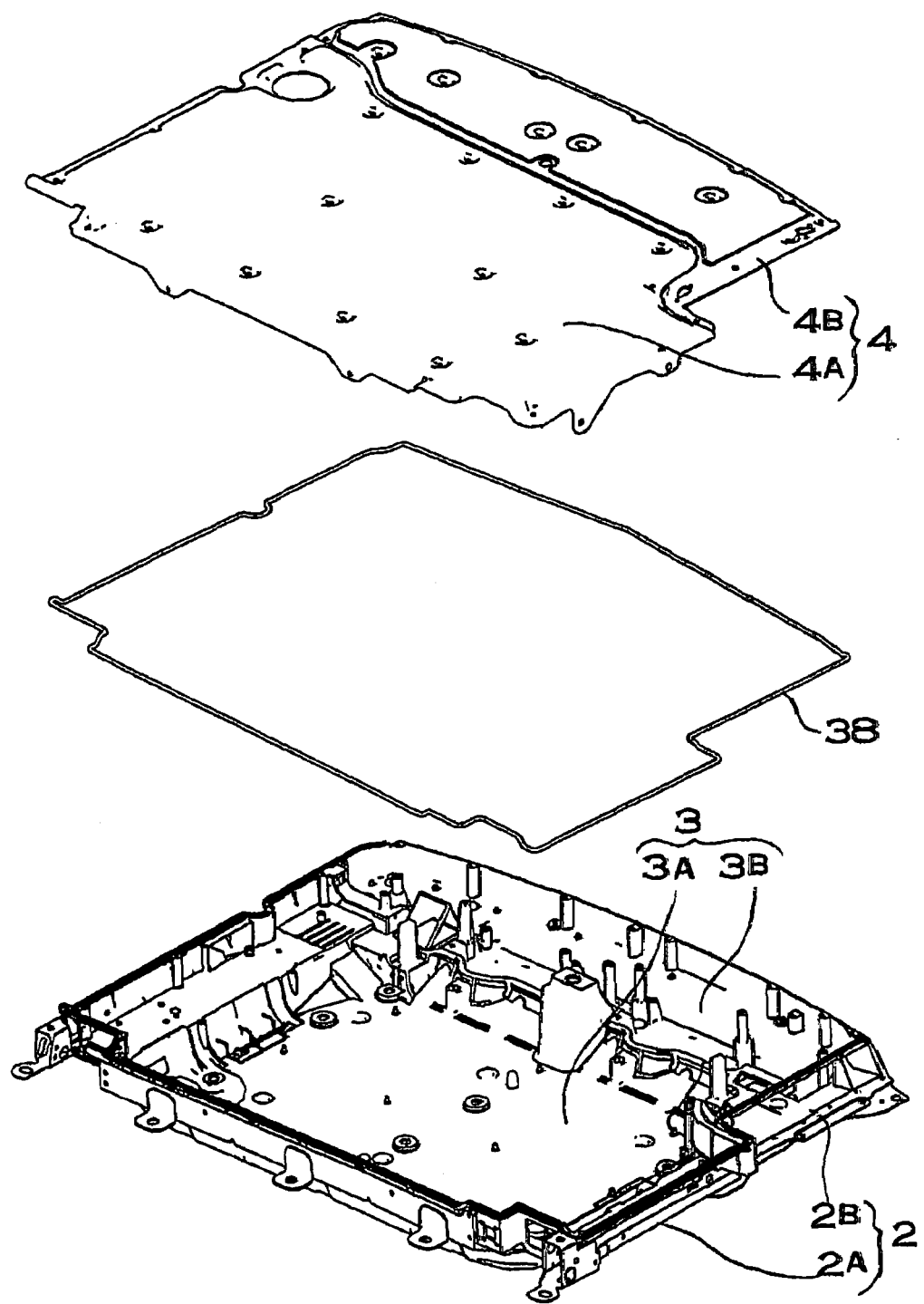
FIG. 28 is an exploded perspective view showing a state in which a ring packing is interposed between an insulating box and the cover plate.

The front cover plate 4A and the rear cover plate 4B are coupled to each other in the waterproof structure, thereby constituting the cover plate 4. The cover plate 4 has a peripheral edge portion coupled to the upper edge of the insulating box 3 through a ring packing 38 in the waterproof structure as shown in FIG. 28. The ring packing 38 is interposed between the cover plate 4 and the upper edge of the insulating box 3 to cause the boundary between the cover plate 4 and the insulating box 3 to have a waterproof structure.

Figure 29:
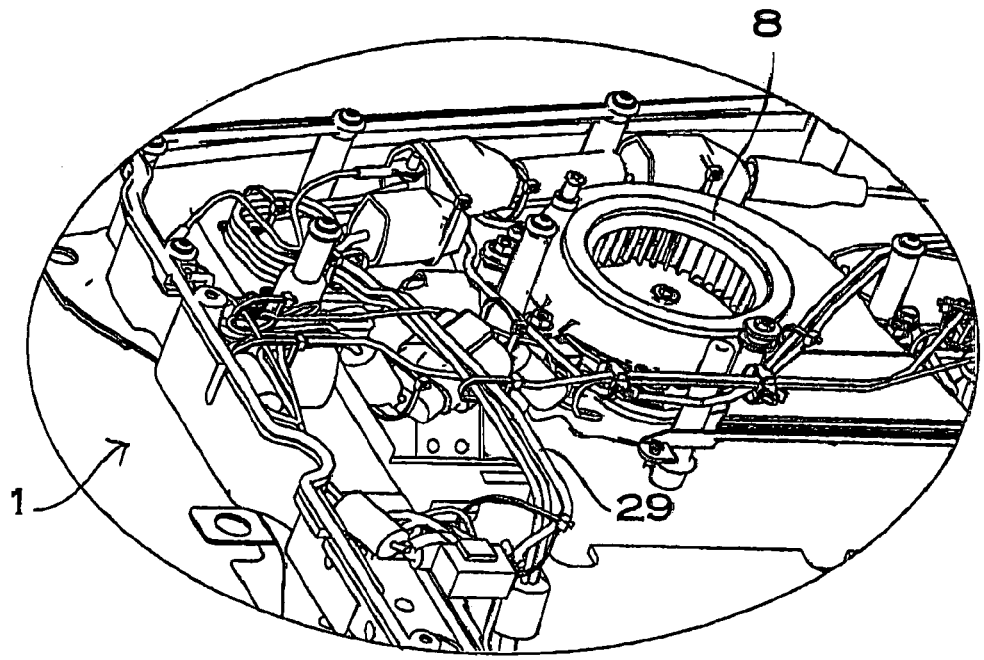
FIG. 29 is an enlarged perspective view showing an internal structure of the power device illustrated in FIG. 3.

The first case 1A is coupled to the second case 1B through a wire harness 29. A battery and a control circuit which are accommodated in the first case 1A are coupled through the wire harness 29 to the fan 8 accommodated in the second case 1B. If the wire harness 29 coupling the first case 1A to the second case 1B is short, the tilt of the first case 1A is limited. The reason is that the wire harness 29 pulls the first case 1A to obstruct the tilt if the wire harness 29 is not disconnected by the shock of the crash. In order to avoid this bad effect, the wire harness 29 is accommodated in the case 1 in such a length as to allow the first case 1A to tilt as shown in FIG. 29. The length of the wire harness 29 is set to couple the first case 1A to the second case 1B at least in such a posture as to tilt the first case 1A at 15 degrees or more. The maximum tilt angle ($\alpha$) of the first case 1A is limited by the stopper cord 16. In the power device, preferably, the length of the wire harness 29 is increased to tilt the first case 1A at the maximum tilt angle ($\alpha$).

Figure 11:
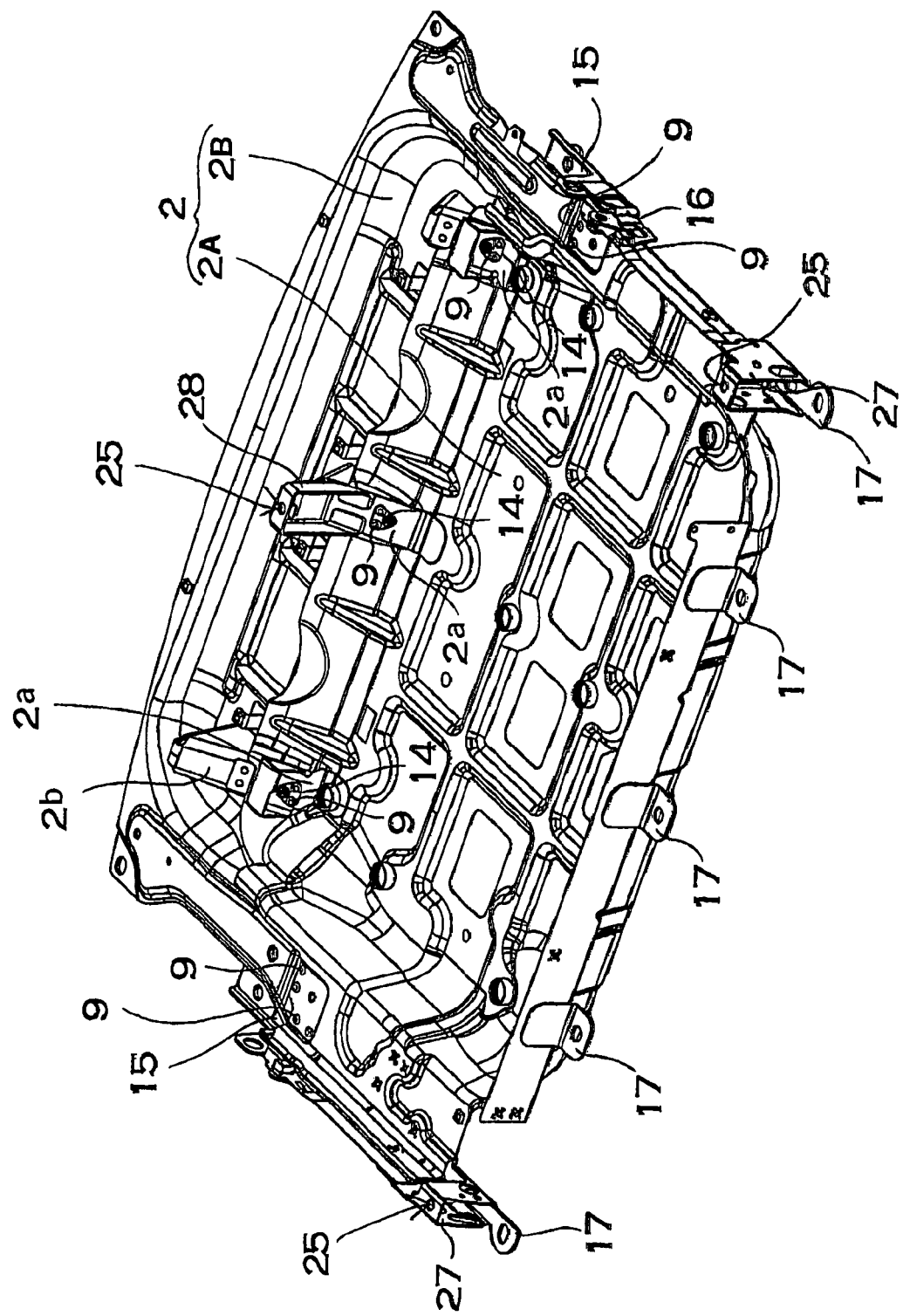
FIG. 11 is a perspective view showing the base plate.
Figure 12:
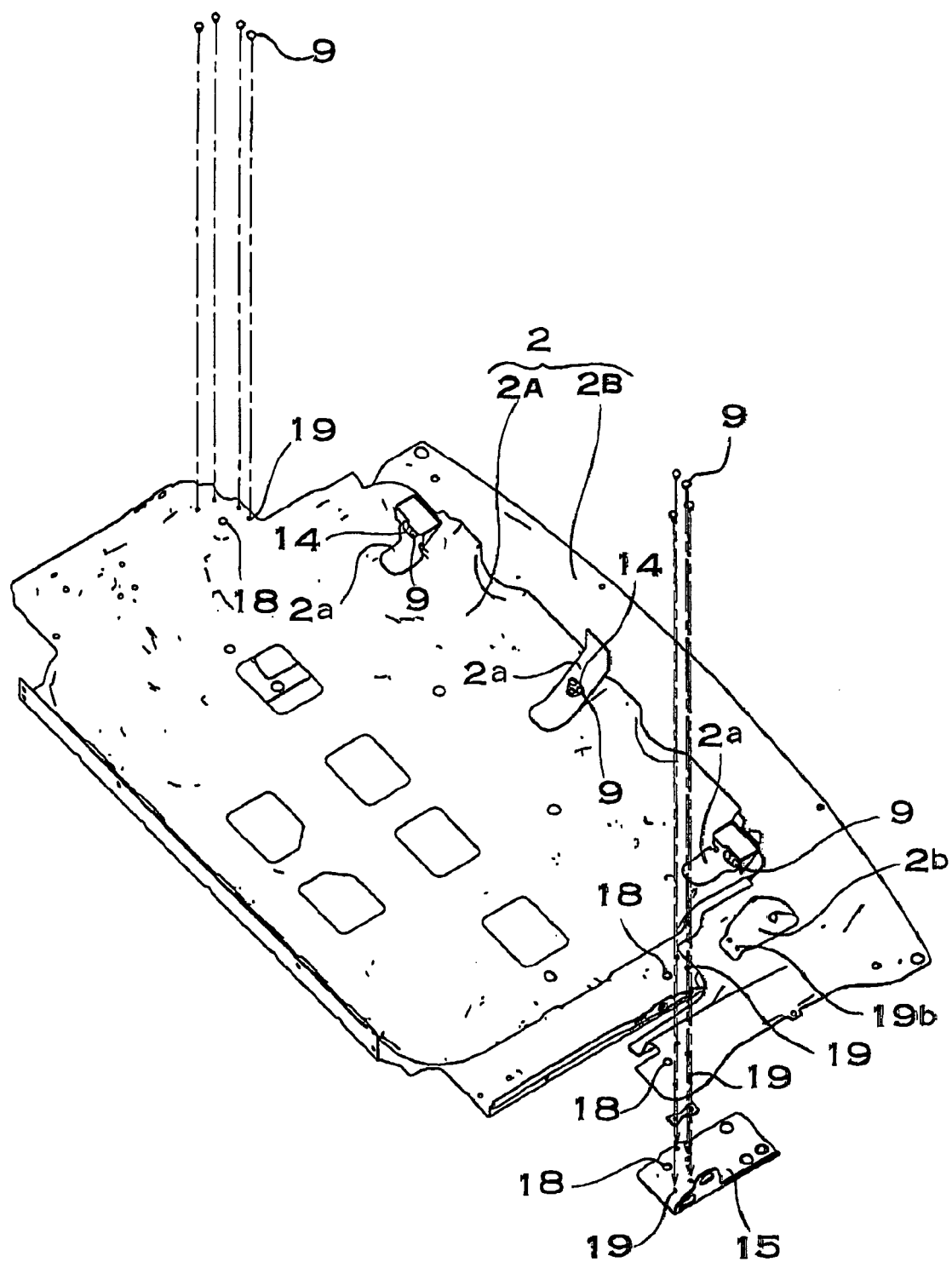
FIG. 12 is an exploded perspective view showing a coupling structure of a front base plate and a rear base plate.
Figure 13:
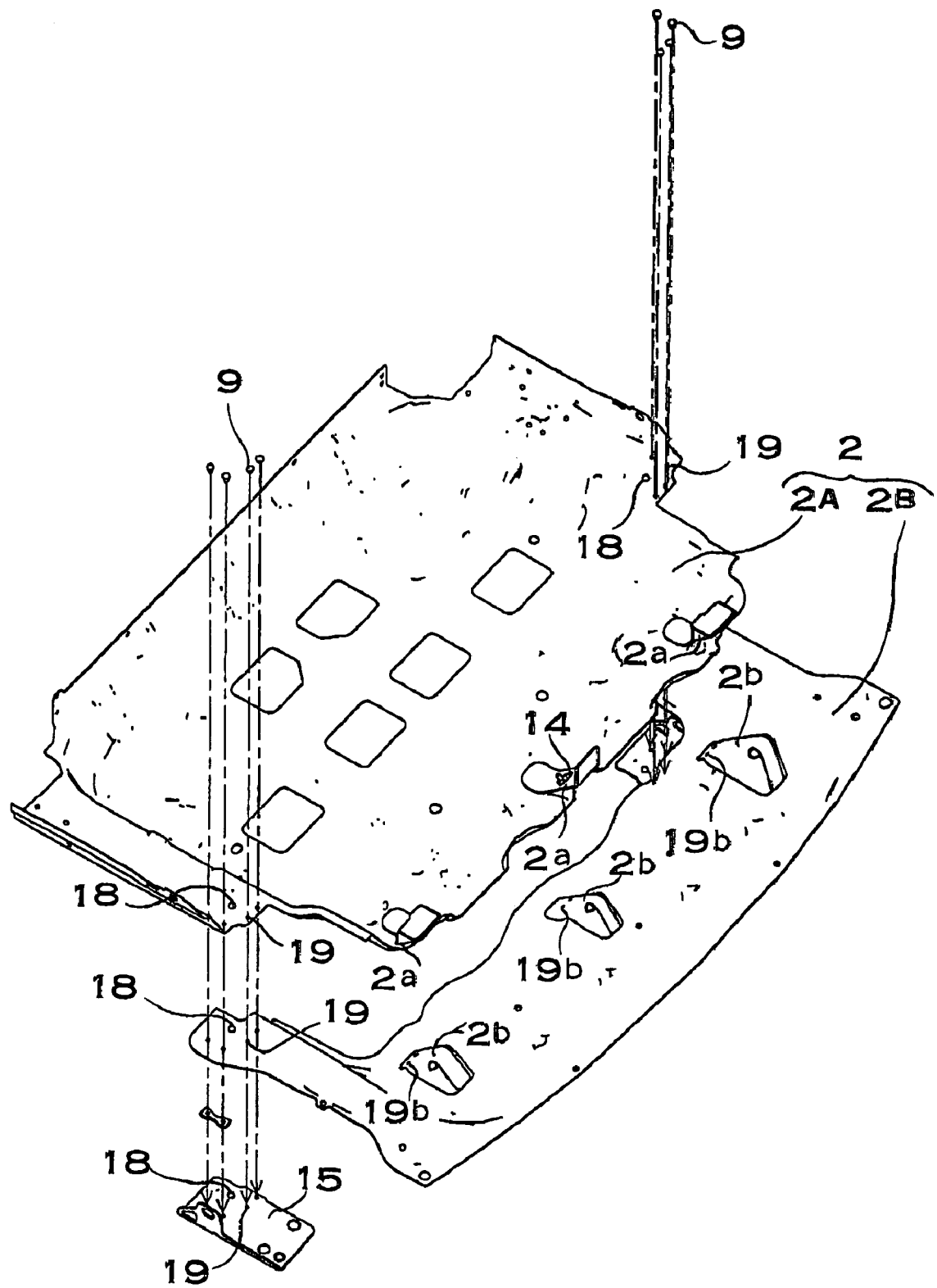
FIG. 13 is a perspective view showing the coupling structure illustrated in FIG. 12 as seen from a back side.
Figure 14:
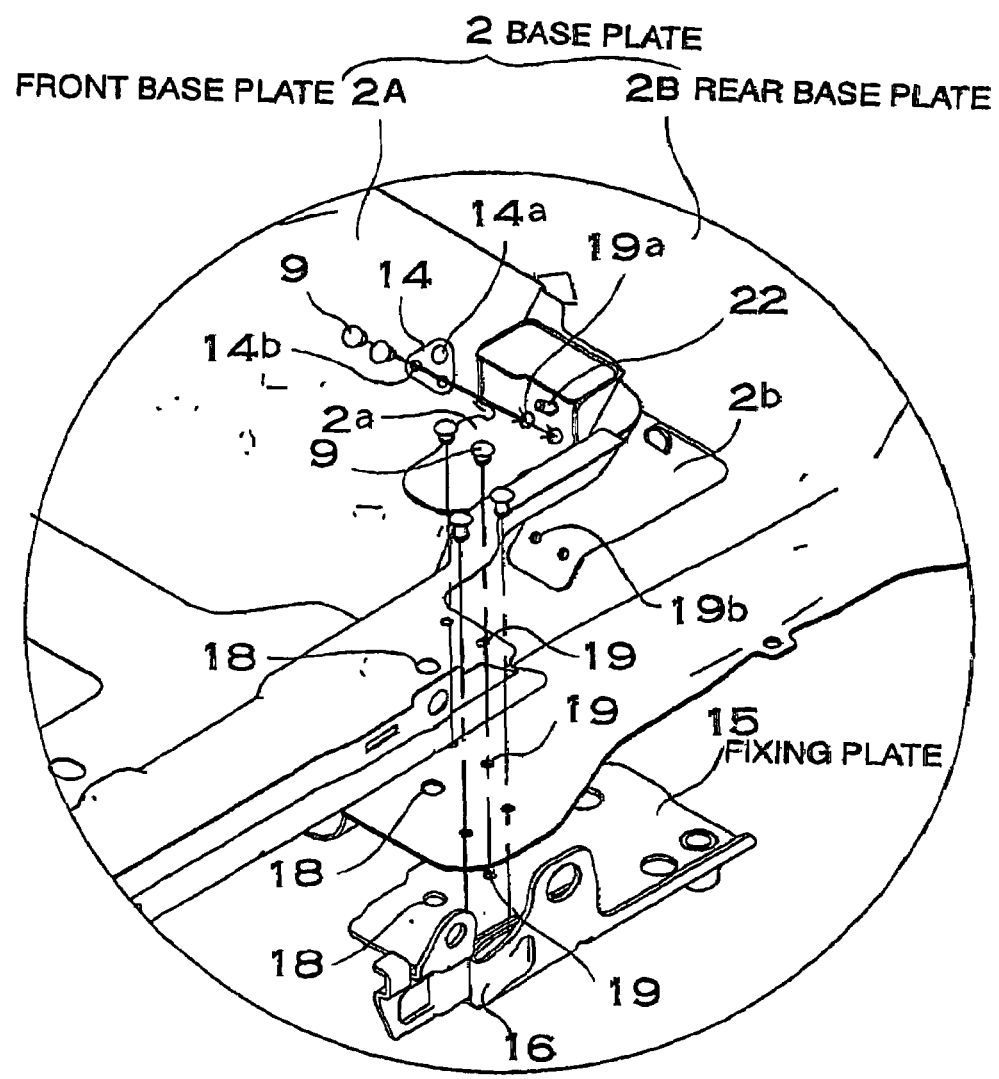
FIG. 14 is an exploded perspective view showing a coupling structure of a right end of the base plate illustrated in FIG. 11.
Figure 15:
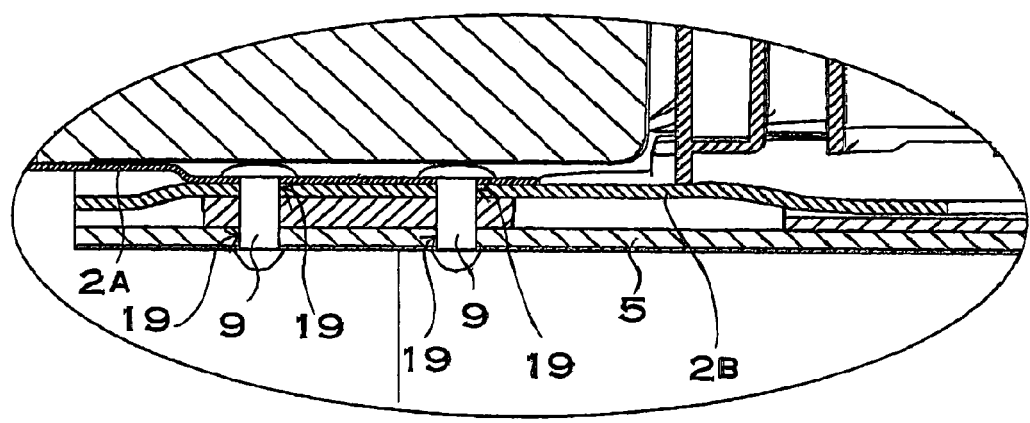
FIG. 15 is an enlarged sectional view showing the coupling structure of the right end of the base plate illustrated in FIG. 11.
Figure 16:
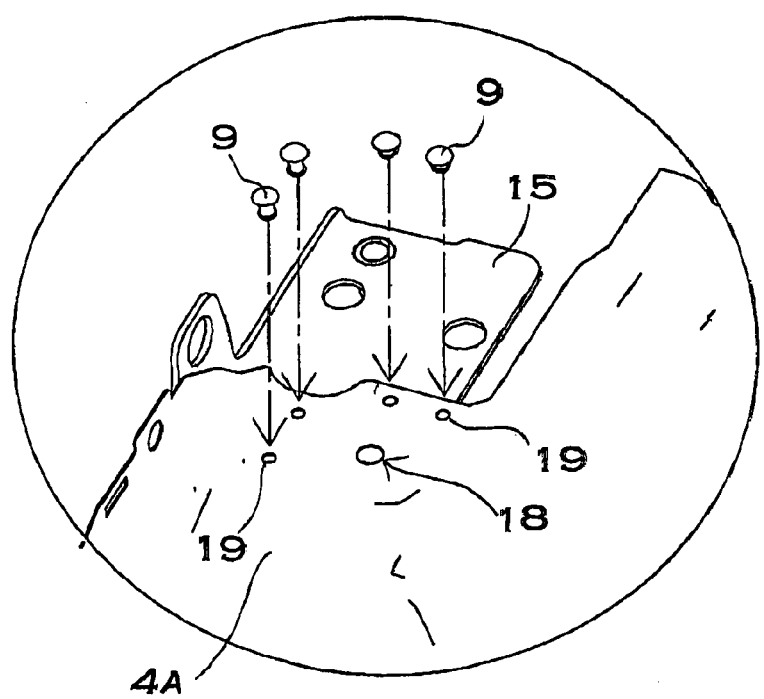
FIG. 16 is an exploded perspective view showing a coupling structure of a left end of the base plate illustrated in FIG. 11.
Figure 17:
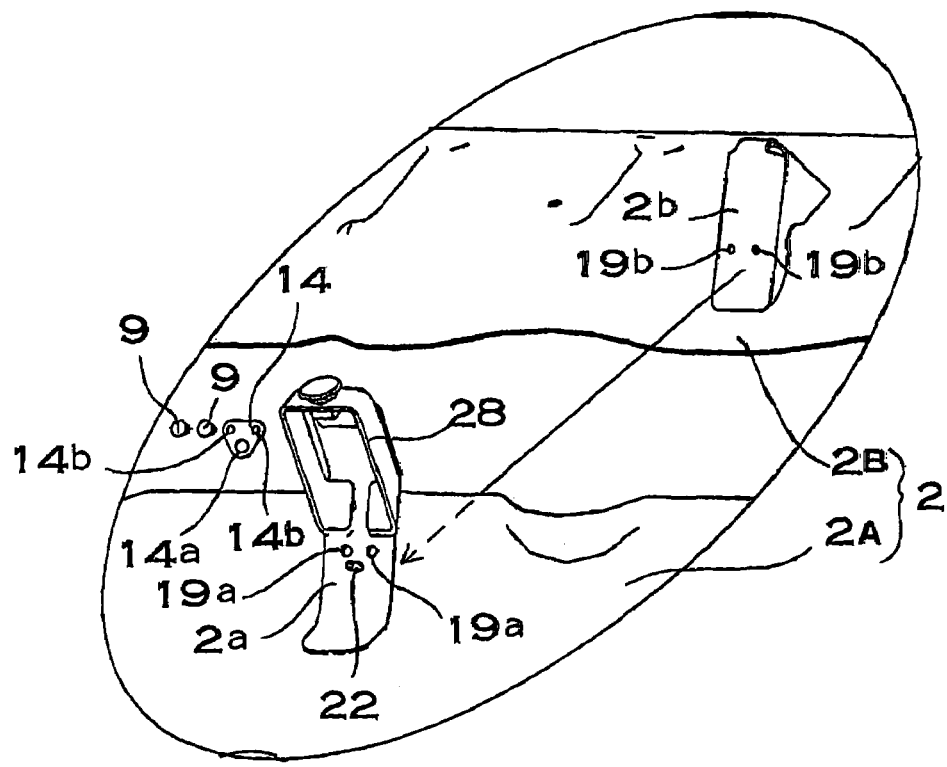
FIG. 17 is an exploded perspective view showing a coupling structure of a central portion of the base plate illustrated in FIG. 11.
Figure 18:
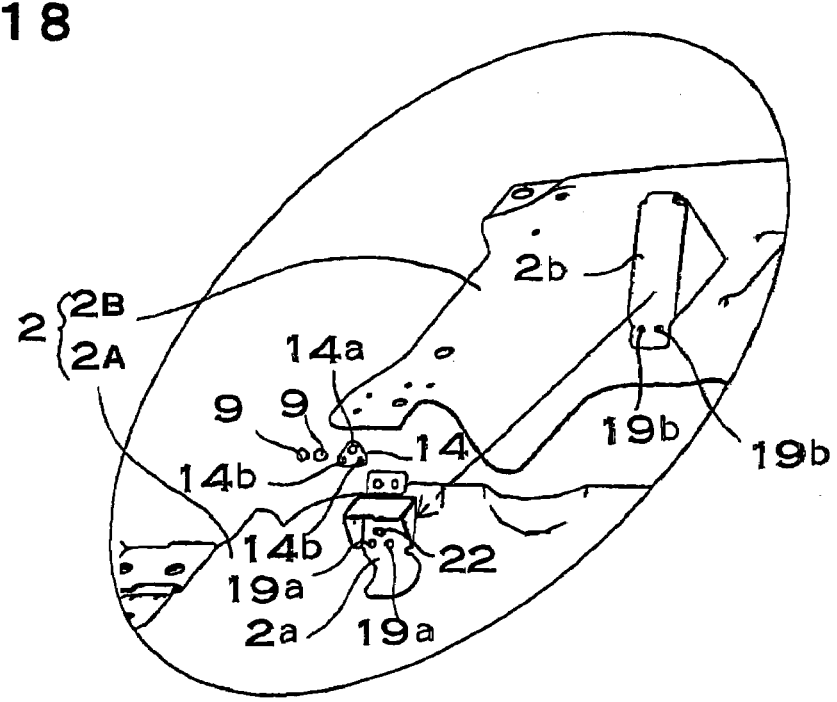
FIG. 18 is an exploded perspective view showing a coupling structure of a central left side portion of the base plate illustrated in FIG. 11.

The power device in FIG. 4 has a suspending portion 25 provided on the upper surface of the case. In the power device shown in FIG. 4, the suspending portion 25 is provided in three places; that is, both sides of a front edge, and the middle part of the rear cover plate 4B. The suspending portion 25 shown in FIG. 4 is a hole capable of inserting and engaging a hook portion (not shown) in a device to be suspended. A fixture is attached to the base plate 2 to provide the suspending portion 25 on both front sides of the case 1. The suspending portion 25 provided on the center of the case 1 is obtained by forming a hole on the upper surface of a coupling table 28 fixed to the center of the rear base plate 2B as shown in FIGS. 9 and 11. The suspending portion 25 is positioned on the upper surface of the case 1 via a through hole 26 opened to penetrate through the rear cover plate 4B and the insulating box 3. The through hole 26 of the rear cover plate 4B is blocked with a waterproof plug 39 which can be removed and attached to block the invasion of water. When the power device is to be suspended, the waterproof plug 39 is removed to couple a hook portion to the through hole 26. Thus, the power device provided with a suspending portion 25 can easily be suspended and removed from a vehicle. Moreover, a power device having a suspending portion 25 which is a hole is mounted on the floor of the vehicle so that the suspending portion 25 is prevented from protruding from the floor.

Figure 30:
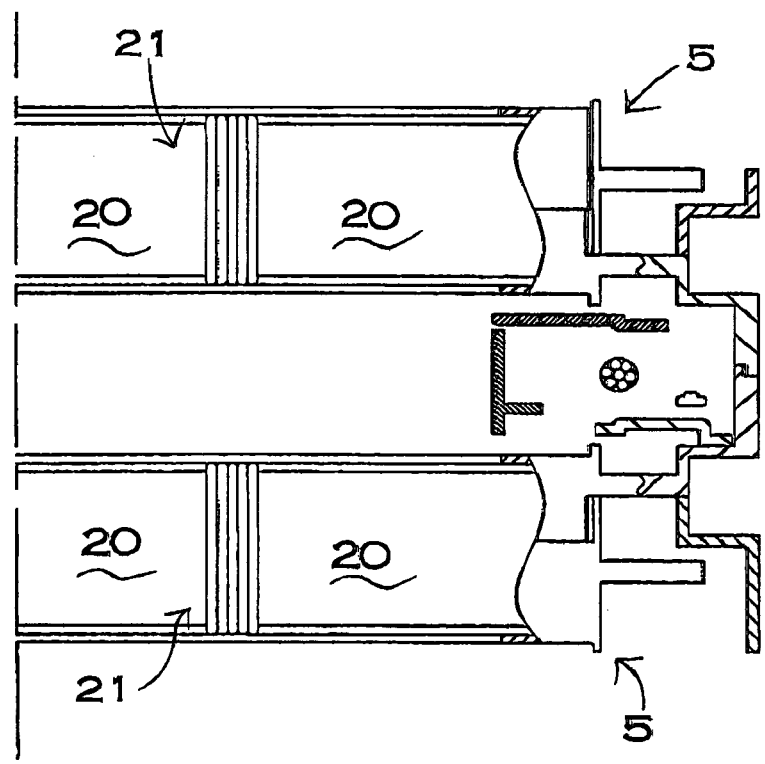
FIG. 30 is an enlarged sectional view showing a holder case.

The battery is put in the holder case 5 which is provided in the insulating box 3. In the holder case 5, the batteries are arranged and accommodated as battery modules 21 in a horizontal plane as shown in a sectional view of FIG. 30. In the holder case 5 in FIG. 30, the battery modules 21 are arranged into upper and lower stages. The holder case 5 in each stage includes a plurality of battery modules 21 provided horizontally in a parallel orientation, which is not shown. Referring to the power device according to the present invention, the holder case can be set to have one stage and the battery module can also be accommodated in one stage, which is not shown.

Figure 31:
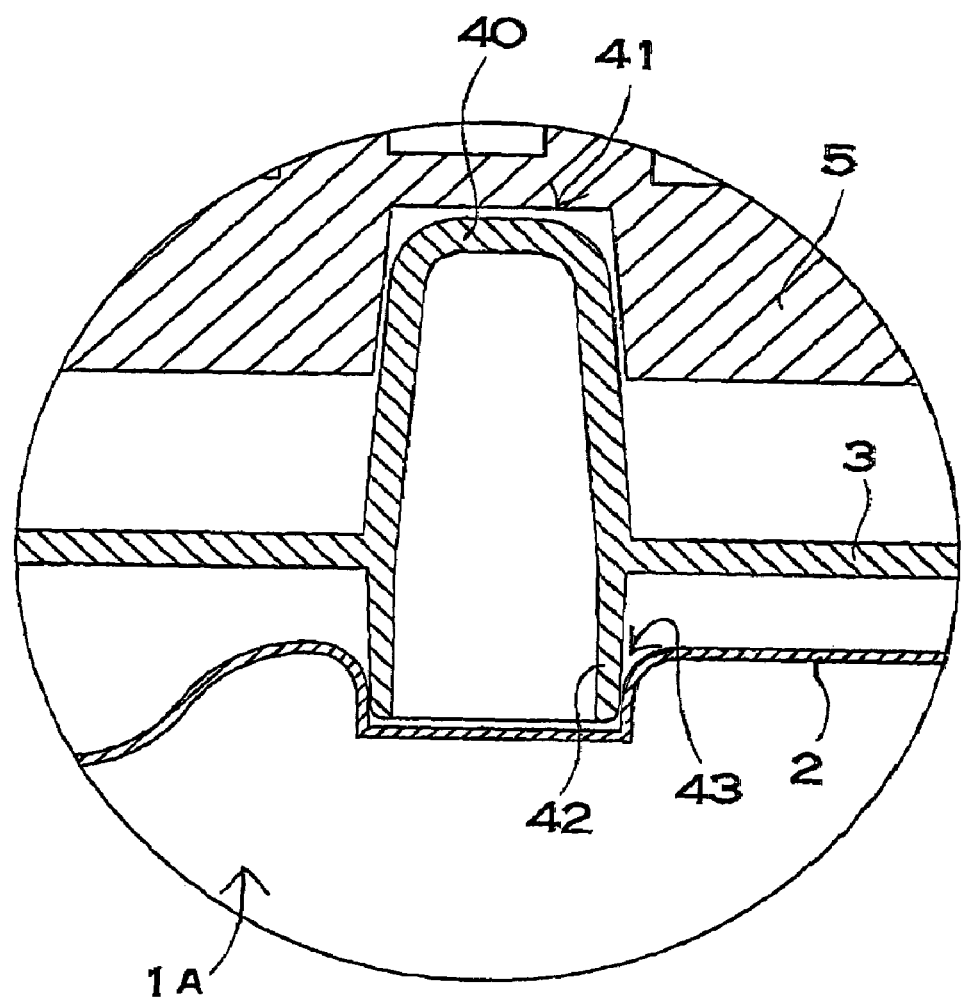
FIG. 31 is an enlarged sectional view showing an example of a coupling structure of the insulating box and the base plate.

The holder case 5 accommodating the battery module 21 is provided in a certain position in the first case 1A. In the first case 1A shown in FIG. 2, a coupling convex portion 40 is protruded upward from the bottom plate of the first box 3A and a coupling concave portion 41 is positioned below the holder case 5 and serves to fit the coupling convex portion 40 therein in order to retain the holder case 5 in a certain position. The coupling convex portion 40 is fitted in the coupling concave portion 41 so that the holder case 5 is provided in a certain position of the first box 3A. With this structure, it is assumed that the holder case 5 can be held in this position while a load acting on the holder case 5 is supported by the first box 3A when the coupling convex portion 40 is fitted in the coupling concave portion 41. As shown in FIG. 31, furthermore, the first case 1A is provided with a fitting convex portion 42 protruded from the lower surface of the insulating box 3 and has a fitting concave portion 43 for fitting the fitting convex portion 42 provided on the bottom face of the base plate 2. With this structure, the fitting convex portion 42 of the insulating box 3 is fitted in the fitting concave portion 43 of the base plate 2 so that the insulating box 3 can be provided in a certain position of the base plate 2. The fitting concave portion 43 of the base plate 2 can seal the bottom, thereby preventing water from entering as shown in FIG. 31. However, it is also possible to set the fitting concave portion 43 to be a through hole without blocking the bottom.

The battery module 21 accommodated in the holder case 5 connects a plurality of secondary batteries 20 in series and couples them rectilinearly. In the battery module 21, four to eight, for example five or six, secondary batteries 20 are connected in series and are thus coupled rectilinearly. The battery module 21 can also be constituted by one secondary battery. In the battery module 21, the secondary battery 20 of a cylindrical type or a square type is coupled rectilinearly through the connecting member of a metal plate or without the connecting member with the end faces of the batteries connected directly in series. An electrode terminal including a positive electrode terminal and a negative electrode terminal is coupled to both ends of the battery module 21. The electrode terminal screws into a bus bar (not shown) of the metal plate, thereby coupling the adjacent battery modules 21 in series or in parallel.

The secondary battery 20 of the battery module 21 is a nickel—hydrogen battery. For the secondary battery of the battery module, it is also possible to use a nickel—cadmium battery, a lithium ion secondary battery or the like.

The holder case 5 is provided with a blast port (not shown) for supplying air to cool the battery module 21. The blast port is coupled to the fan 8 provided in the second case 1B. The fan 8 forcibly supplies the cool air to the holder case 5, thereby cooling the battery. The holder case 5 is fixed to the first case 1A. The front base plate 2A is fixed to the upper surface of the holder case 5 through a setscrew 34.

The power device having the structure described above is divided into a first case 1A and a second case 1B as shown in FIG. 10 upon a rear-end collision or crash. At this time, the insulating box 3 is divided at the coupling portion of the first box 3A and the second box 3B, that is, at the boundary in which the coupling convex portion 11 is fitted in the coupling groove 10 and they are coupled through the adhesive 13 and the coupling tool 12. The second case 1B separated from the first case 1A moves to a position under the first case 1A, and the first case 1A is tilted in a vertical direction from a horizontal orientation. The first box 3A and the second box 3B are separated at the portion in which they are separately formed and coupled.

As this invention may be embodied in several forms without departing from the spirit or essential characteristics thereof, the present embodiment is illustrative and not restrictive. The scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power device for a vehicle comprising:
   a case divided into a first case and a second case;
   a battery disposed in the case for driving a motor; and
   a coupling member coupling the first case to the second case and capable of being separated by a shock of a crash;
   wherein the first case comprises a first tilted portion and the second case comprises a second tilted portion, and
   wherein the coupling member comprises a shock breakage pin to be broken by a predetermined shock, and the shock breakage pin penetrates through the first tilted portion and the second tilted portion.

2. The power device for a vehicle according to claim 1, wherein the shock breakage pin is a rivet to be broken by a shock of a crash.

3. The power device for a vehicle according to claim 2, wherein the rivet is made of aluminum.

4. The power device for a vehicle according to claim 1, wherein the first case and the second case are coupled in such a manner that the first case is tilted and the second case is moved to a position under the first case with a shock of a crash.

5. The power device for a vehicle according to claim 4, further comprising
   a fixing plate to be fixed to the vehicles; and
   a stopper cord, wherein
   the stopper cord couples the fixing plate to a rear portion of the first case and limits a maximum tilt angle of the first case.

6. The power device for a vehicle according to claim 1, further comprising a fixing plate fixed to the vehicle,
   wherein the first case includes a front base plate made of metal and the second case includes a rear base plate made of metal,
   wherein the front base plate, the rear base plate, and the fixing plate are coupled by the shock breakage pin, and
   wherein the fixing plate is provided as a lower part, the front base plate is provided as an upper part, and the rear base plate is provided between the upper part and the lower part.

7. The power device for a vehicle according to claim 1, further comprising:
   a front cover plate as an upper cover of the first case;
   a rear cover plate as an upper cover of the second case;
   a boundary groove provided along either the front cover plate or the rear cover plate; and
   a coupling packing between the front cover plate and the rear cover plate disposed in the boundary groove;
   wherein a first one of the front cover plate and the rear cover plate is laminated on a lower surface to form a lower laminated portion,
   wherein a second one of the front cover plate and the rear cover plate is laminated on an upper surface to form an upper laminated portion, and
   wherein the front cover plate and the rear cover plate are coupled via the lower laminated portion, the boundary groove, the coupling packing, and the upper laminated portion to form a laminated, waterproof structure.

8. The power device for a vehicle according to claim 1, further comprising a wire harness coupling the first case to the second case, the wire harness having such a length as to couple the first case to the second case at a posture where the first case is tilted at 15 degrees or more.

9. The power device for a vehicle according to claim 1, further comprising a frictional resistance reducing sheet interposed between the first tilted portion and the second tilted portion.

10. The power device for a vehicle according to claim 1, further comprising a suspending portion is provided on an upper surface of the case.

11. The power device for a vehicle according to claim 1, wherein the battery is accommodated in the first case.

12. A power device for a vehicle comprising:
    a case divided into a first case and a second case;
    a battery disposed in the case for driving a motor;
    a coupling member coupling the first case to the second case and capable of being separated by a shock of a crash; and
    a hinge connected to a front edge of the first case;
    wherein the coupling member couples the first case to the second case such that the first case and the second case are at least partially laminated to form a laminated portion, wherein the coupling member comprises a shock breakage pin to be broken by a predetermined shock, and the shock breakage pin penetrates through the laminated portion, and wherein the tiltably couples the first case to the vehicle.

13. A power device for a vehicle comprising:

a case divided into a first case and a second case;

a battery disposed in the case for driving a motor; and a coupling member coupling the first case to the second case and capable of being separated by a shock of a crash;

wherein the coupling member couples the first case to the second case such that the first case and the second case are at least partially laminated to form a laminated portion, wherein the coupling member comprises a shock breakage pin to be broken by a predetermined shock, and the shock breakage pin penetrates through the laminated portion, and wherein the first case includes a front base plate made of metal and the second case includes a rear base plate made of metal, and the front base plate and the rear base plate are coupled to each other by the shock breakage pin.

14. The power device for a vehicle according to claim 13, wherein the front base of the first case has a greater breaking strength than the shock breakage pin.

15. A power device for a vehicle comprising:

a case divided into a first case and a second case;

a battery disposed in the case for driving a motor; and a coupling member coupling the first case to the second case and capable of being separated by a shock of a crash;

wherein the coupling member couples the first case to the second case such that the first case and the second case are at least partially laminated to form a laminated portion, wherein the coupling member comprises a shock breakage pin to be broken by a predetermined shock, and the shock breakage pin penetrates through the laminated portion, and wherein the first case includes a front base plate as a bottom plate and a front cover plate as an upper cover, and the front cover plate is fixed to the front base plate.

16. A power device for a vehicle comprising:

a case divided into a first case and a second case;

a battery disposed in the case for driving a motor; and a coupling member coupling the first case to the second case and capable of being separated by a shock of a crash;

wherein the coupling member couples the first case to the second case such that the first case and the second case are at least partially laminated to form a laminated portion, wherein the coupling member comprises a shock breakage pin to be broken by a predetermined shock, and the shock breakage pin penetrates through the laminated portion, and wherein the second case includes a rear base plate as a bottom plate and a rear cover plate as an upper cover, and the rear base plate and the rear cover plate are coupled to each other through a wire.

17. A power device for a vehicle comprising:

a case divided into a first case and a second case;

a battery disposed in the case for driving a motor; and a coupling member coupling the first case to the second case and capable of being separated by a shock of a crash;

wherein the coupling member couples the first case and the second case such that the first case and the second case are at least partially laminated to form a laminated portion, wherein the coupling member comprises a shock breakage pin to be broken by a predetermined shock, and the shock breakage pin penetrates through the laminated portion, and wherein the first case includes a front base plate as a bottom plate and an insulating box formed of plastic which is provided on the front base plate, and the insulating box is provided with a holder case for accommodating the battery therein.

* * * * *